(12) United States Patent
Matsumura

(10) Patent No.: US 11,474,764 B2
(45) Date of Patent: Oct. 18, 2022

(54) IMAGE FORMING APPARATUS THAT PREDICTS MAINTENANCE TIME, MANAGEMENT APPARATUS, MANAGEMENT SYSTEM, AND CONTROL METHOD THEREFOR

(71) Applicant: CANON KABUSHIKI KAISHA, Tokyo (JP)

(72) Inventor: Takeshi Matsumura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/526,311

(22) Filed: Nov. 15, 2021

(65) Prior Publication Data

US 2022/0188052 A1    Jun. 16, 2022

(30) Foreign Application Priority Data

Dec. 10, 2020    (JP) .............................. JP2020-204960

(51) Int. Cl.
   *G06F 3/12*    (2006.01)
(52) U.S. Cl.
   CPC .......... *G06F 3/1259* (2013.01); *G06F 3/1211* (2013.01); *G06F 3/1291* (2013.01)
(58) Field of Classification Search
   CPC .... G06F 3/1259; G06F 3/1211; G06F 3/1291; G06F 3/1229; G06F 3/1263; G06F 3/1237
   See application file for complete search history.

(56) References Cited

U.S. PATENT DOCUMENTS

| | | | |
|---|---|---|---|
| 6,446,224 B1* | 9/2002 | Chang ................... | G06F 11/073 714/47.1 |
| 2009/0033993 A1* | 2/2009 | Nakazato .............. | G06F 3/1286 358/1.15 |
| 2012/0075659 A1* | 3/2012 | Sawada .................. | G03G 15/55 358/1.14 |
| 2015/0067090 A1* | 3/2015 | Resch ................... | G06F 3/0641 709/213 |

FOREIGN PATENT DOCUMENTS

| | | |
|---|---|---|
| JP | 2011166427 A | 8/2011 |
| JP | 2019028628 A | 2/2019 |

* cited by examiner

*Primary Examiner* — Iriana Cruz
(74) *Attorney, Agent, or Firm* — Rossi, Kimms & McDowell LLP

(57) ABSTRACT

A management system capable of managing an apparatus with high accuracy at low cost without deteriorating productivity. The management system includes an image forming apparatus and a management apparatus that are communicatively connected. The image forming apparatus includes an obtainment unit that obtains data for items to which priorities are given, a first storage unit that stores the data, a transmission unit that transmits the data to the management apparatus, and an update unit that updates the priorities of the items according to a notification from the management apparatus. The management apparatus includes a second storage unit that stores data from the image forming apparatus, a determination unit that determines whether interpolation of defective data is possible for the items, a change unit that changes the priorities of the items according to possibility of the interpolation, and a notification unit that notifies of the priorities of the changed items.

9 Claims, 23 Drawing Sheets

| DATA ITEM (DATA ID) | DATA OBTAINMENT SOURCE | DATA TYPE | FEATURE EXTRACTION PROCESS | INTERPOLATION PROCESS | ALLOWABLE ERROR | INTERPOLATION PROPRIETY FLAG |
|---|---|---|---|---|---|---|
| SCAN COUNT(0-0001) | READER UNIT | COUNT VALUE | -- | -- | -- | -- |
| PRINT COUNT(1-0001) | PRINTER UNIT | COUNT VALUE | -- | -- | -- | -- |
| TEMPERATURE OF FIXING UNIT(1) | PRINTER UNIT | SENSOR MEASUREMENT VALUE | MAXIMUM VALUE CALCULATION PROCESS | THRESHOLD PROCESS | 1 | 1 |
| : | : | : | : | : | : | : |
| ROTATION SPEED OF INTERMEDIATE TRANSFER BELT MOTOR(2) | PRINTER UNIT | SENSOR MEASUREMENT VALUE | HISTOGRAM CALCULATION PROCESS | DISPERSION POWER | 2 | 0 |
| ROTATION SPEED OF INTERMEDIATE TRANSFER BELT(1-2003) | PRINTER UNIT | SENSOR MEASUREMENT VALUE | FREQUENCY ANALYSIS | CYCLE ANALYSIS | 2 | 0 |
| TRAVEL DISTANCE OF SECONDARY TRANSFER ROLLER(1001) | PRINTER UNIT | SENSOR MEASUREMENT VALUE | MOVING AVERAGE PROCESS | TILT ANALYSIS PROCESS | 3 | 0 |
| TONER DENSITY(2001) | PRINTER UNIT | SENSOR MEASUREMENT VALUE | MOVING AVERAGE PROCESS | LINEAR INTERPOLATION | 4 | 0 |
| : | : | : | : | : | : | : |
| LOG DATA(3-0001) | STORAGE UNIT | TEXT | -- | -- | -- | -- |

FIG. 6A

| DATA ITEM (DATA ID) 601 | PRIORITY 602 | 2020/01/01/01:01:00 603a | 2010/01/01/01:01:15 603b | 2010/01/01/01:01:30 603c | ... |
|---|---|---|---|---|---|
| TEMPERATURE OF FIXING UNIT(1) | 1 | 250 | 248 | 251 | ... |
| ... | ... | ... | ... | ... | ... |
| ROTATION SPEED OF INTERMEDIATE TRANSFER BELT MOTOR(2) | 1 | 2013 | 2019 | 2005 | ... |
| TRAVEL DISTANCE OF SECONDARY TRANSFER ROLLER(1001) | 2 | 3.5 | 8.9 | 5.6 | ... |
| ... | ... | ... | ... | ... | ... |
| TONER DENSITY(2001) | 3 | 980 | 970 | 978 | ... |
| ... | ... | ... | ... | ... | ... |

FIG. 6B

| DATA ITEM (DATA ID) 601 | DATA OBTAINMENT SOURCE 605 | DATA TYPE 606 | FEATURE EXTRACTION PROCESS 607 | INTERPOLATION PROCESS 608 | ALLOWABLE ERROR 609 | INTERPOLATION PROPRIETY FLAG 610 |
|---|---|---|---|---|---|---|
| SCAN COUNT(0-0001) | READER UNIT | COUNT VALUE | - | - | - | 1 |
| PRINT COUNT(1-0001) | PRINTER UNIT | COUNT VALUE | - | - | - | 1 |
| TEMPERATURE OF FIXING UNIT(1) | PRINTER UNIT | SENSOR MEASUREMENT VALUE | MAXIMUM VALUE CALCULATION PROCESS | THRESHOLD PROCESS | 1 | 1 |
| ⋮ | ⋮ | ⋮ | ⋮ | ⋮ | ⋮ | ⋮ |
| ROTATION SPEED OF INTERMEDIATE TRANSFER BELT MOTOR(2) | PRINTER UNIT | SENSOR MEASUREMENT VALUE | HISTOGRAM CALCULATION PROCESS | DISPERSION POWER | 2 | 0 |
| ROTATION SPEED OF INTERMEDIATE TRANSFER BELT(1-2003) | PRINTER UNIT | SENSOR MEASUREMENT VALUE | FREQUENCY ANALYSIS | CYCLE ANALYSIS | 2 | 0 |
| TRAVEL DISTANCE OF SECONDARY TRANSFER ROLLER(1001) | PRINTER UNIT | SENSOR MEASUREMENT VALUE | MOVING AVERAGE PROCESS | TILT ANALYSIS PROCESS | 3 | 0 |
| TONER DENSITY(2001) | PRINTER UNIT | SENSOR MEASUREMENT VALUE | MOVING AVERAGE PROCESS | LINEAR INTERPOLATION | 4 | 0 |
| ⋮ | ⋮ | ⋮ | ⋮ | ⋮ | ⋮ | ⋮ |
| LOG DATA(3-0001) | STORAGE UNIT | TEXT | - | - | - | 1 |

*FIG. 7*

| ADDRESS 701 | TIME 603 | DATA ID 601 | SENSOR MEASUREMENT VALUE 702 | PRIORITY 602 |
|---|---|---|---|---|
| 0 | 2020/01/01/01:01:00 | 1 | 250 | 1 |
| 1 | 2020/01/01/01:01:15 | 1 | 248 | 1 |
| 2 | 2020/01/01/01:01:00 | 2 | 2013 | 1 |
| 3 | 2020/01/01/01:01:15 | 2 | 2019 | 1 |
| . | . | . | . | . |
| . | . | . | . | . |
| . | . | . | . | . |
| 1000 | 2020/01/01/01:01:00 | 1001 | 3.5 | 2 |
| 1001 | 2020/01/01/01:01:15 | 1001 | 8.9 | 2 |
| 1002 | 2020/01/01/01:01:30 | 1001 | 5.6 | 2 |
| 1003 | 2020/01/01/01:01:00 | 1002 | 1 | 2 |
| . | . | . | . | . |
| . | . | . | . | . |
| . | . | . | . | . |
| 2000 | 2020/01/01/01:01:00 | 2001 | 980 | 3 |
| 2001 | 2020/01/01/01:01:15 | 2001 | 970 | 3 |
| 2002 | 2020/01/01/01:01:30 | 2001 | 978 | 3 |
| 2003 | 2020/01/01/01:01:45 | 2001 | 999 | 3 |
| . | . | . | . | . |
| . | . | . | . | . |
| . | . | . | . | . |

FIG. 8A

| ADDRESS | TIME | DATA ID | SENSOR MEASUREMENT VALUE | PRIORITY |
|---|---|---|---|---|
| 0 | 2020/01/01/01:11:00 | 1 | 248 | 1 |
| 1 | 2020/01/01/01:11:15 | 1 | 249 | 1 |
| 2 | 2020/01/01/01:11:00 | 2 | 2018 | 1 |
| 3 | 2020/01/01/01:11:15 | 2 | 2015 | 1 |
| . | . | . | . | . |
| . | . | . | . | . |
| . | . | . | . | . |
| 1000 | 2020/01/01/01:11:00 | 1001 | 3.4 | 2 |
| 1001 | 2020/01/01/01:11:15 | 1001 | 8.2 | 2 |
| 1002 | 2020/01/01/01:11:30 | 1001 | 5.3 | 2 |
| 1003 | 2020/01/01/01:11:00 | 1002 | 1.8 | 2 |
| . | . | . | . | . |
| . | . | . | . | . |
| . | . | . | . | . |
| 2000 | 2020/01/01/01:11:00 | 2001 | 999 | 3 |
| 2001 | 2020/01/01/01:11:15 | 2001 | 985 | 3 |
| 2002 | 2020/01/01/01:11:30 | 2001 | 974 | 3 |
| 2003 | 2020/01/01/01:11:45 | 2001 | 1000 | 3 |
| . | . | . | . | . |
| . | . | . | . | . |
| . | . | . | . | . |

FIG. 8B

| ADDRESS | TIME | DATA ID | SENSOR MEASUREMENT VALUE | PRIORITY |
|---|---|---|---|---|
| 0 | 2020/01/01/01:11:00 | 1 | 248 | 1 |
| 1 | 2020/01/01/01:11:15 | 1 | 249 | 1 |
| 2 | 2020/01/01/01:11:00 | 2 | 2018 | 1 |
| 3 | 2020/01/01/01:11:15 | 2 | 2015 | 1 |
| . | . | . | . | . |
| . | . | . | . | . |
| . | . | . | . | . |
| 1000 | 2020/01/01/01:11:00 | 1001 | 3.4 | 2 |
| 1001 | 2020/01/01/01:11:15 | 1001 | 8.2 | 2 |
| 1002 | 2020/01/01/01:11:30 | 1001 | 5.3 | 2 |
| 1003 | 2020/01/01/01:11:00 | 1002 | 1.8 | 2 |
| . | . | . | . | . |
| . | . | . | . | . |
| . | . | . | . | . |
| 2000 | 2020/01/01/01:21:00 | 1 | 247 | 1 |
| 2001 | 2020/01/01/01:21:15 | 1 | 253 | 1 |
| 2002 | 2020/01/01/01:21:00 | 2 | 2017 | 1 |
| 2003 | 2020/01/01/01:21:15 | 2 | 2021 | 1 |
| . | . | . | . | . |
| . | . | . | . | . |
| . | . | . | . | . |

ABNORMALITY GENERATION SECTION

LINEAR INTERPOLATION

IMAGE FORMING APPARATUS THAT PREDICTS MAINTENANCE TIME, MANAGEMENT APPARATUS, MANAGEMENT SYSTEM, AND CONTROL METHOD THEREFOR

BACKGROUND OF THE INVENTION

Field of the Invention

The present invention relates to an image forming apparatus that predicts maintenance time, a management apparatus, a management system, and its control system.

Description of the Related Art

Japanese Laid-Open Patent Publication (Kokai) No. 2011-166427 (JP 2011-166427A)) proposes a system that detects a sign of an abnormality or a malfunction on the basis of status information obtained by monitoring a status of an image forming apparatus and that predicts maintenance time, such as replacement of consumables.

In such a system, when a sign of an abnormality that is determined to need maintenance in order to continue operating the image forming apparatus normally is detected, a management apparatus connected to the image forming apparatus through a network is notified of the sign. Then, a maintenance person of the image forming apparatus is able to perform maintenance of the image forming apparatus quickly because the management apparatus contacts the maintenance person. Moreover, when maintenance is performed in a suitable timing based on a state of the image forming apparatus, occurrence of situation where a malfunction disturbs the operation can be reduced. Since the image forming apparatus operates stably in this way, downtime of a user can be reduced.

Furthermore, Japanese Laid-Open Patent Publication (Kokai) No. 2019-28628 (JP 2019-28628A) proposes a system that determines whether interpolation can be performed when the interpolation is necessary to analyze collected status data. The system performs a data interpolation process when it is determined that the interpolation can be performed.

The above-mentioned system is configured to connect a plurality of image forming apparatuses to a management apparatus through a network. Then, the management apparatus is operated to accumulate the status data of the image forming apparatus and to notify a maintenance person of a maintenance timing. In addition, the management apparatus is operated to develop a technique by using the accumulated data and to mount a developed new function to the management apparatus.

In order to detect a sign of an abnormality and to predict maintenance time with high accuracy in the above-mentioned system, it is necessary to control various sensors that detect the status data, to collect their measurement values, and to transmit the collected measurement values to the management apparatus in real time.

Such a process is performed in parallel to a job process, such as a print process that is an inherent function of the image forming apparatus. Accordingly, if necessity of preferential execution of one of a job process like a print process, a detection process, and a transmission process occurs, productivity of the print process or the like deteriorates or a miss occurs in the status data. In the meantime, if a highly efficient controller (CPU) and a large-capacity memory that can execute all the processes simultaneously are employed, the above-mentioned problem will be solved, but the cost will increase remarkably.

SUMMARY OF THE INVENTION

The present invention provides a management system that is capable of managing an apparatus with high accuracy at low cost without deteriorating productivity.

Accordingly, an aspect of the present invention provides a management system including at least one image forming apparatus including an obtainment unit configured to obtain data showing statuses inside the at least one image forming apparatus for items to which priorities that define obtainment orders are given, a first storage unit configured to store the data as time series data, a transmission unit configured to transmit the data stored in the first storage unit to a management apparatus that is communicatively connected with the at least one image forming apparatus, and an update unit configured to update the priorities of the items according to a notification transmitted from the management apparatus, and the management apparatus including a second storage unit configured to store data transmitted from the at least one image forming apparatus, a determination unit configured to determine whether interpolation of defective data based on the data accumulated in the second storage unit is possible for the items in a case where deficiency occurs in the data stored in the second storage unit, a change unit configured to change the priorities of the items according to possibility of the interpolation determined by the determination unit, and a notification unit configured to notify the at least one image forming apparatus of the priorities of the items that are changed by the change unit.

According to the present invention, the management system that is capable of managing an apparatus with high accuracy at low cost without deteriorating productivity is achieved.

Further features of the present invention will become apparent from the following description of exemplary embodiments with reference to the attached drawings.

BRIEF DESCRIPTION OF THE DRAWINGS

FIG. 6A and FIG. 6B are views describing contents of information data generated by the printer unit and contents of a definition table stored in a storage unit, respectively.

FIG. 7 is a schematic view showing a hold state of the status information data in the image forming apparatus.

FIG. 8A and FIG. 8B are schematic views describing an accumulation method of the status information data in the image forming apparatus.

DESCRIPTION OF THE EMBODIMENTS

Figure 1:
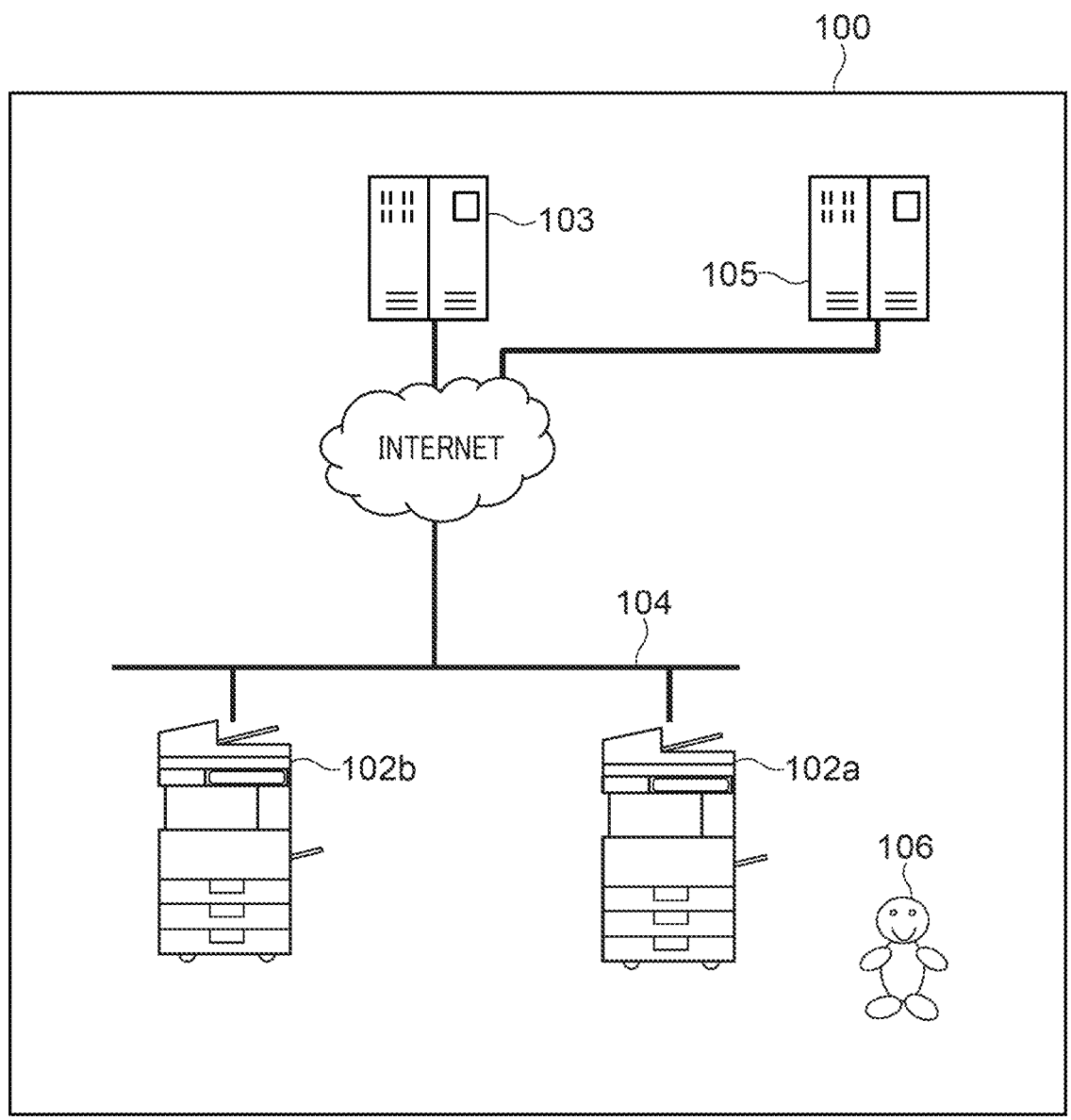
FIG. 1 is a view schematically showing a configuration of a management system according to an embodiment of the present invention.

Hereafter, embodiments according to the present invention will be described in detail by referring to the drawings.

FIG. 1 is a view schematically showing a configuration of a management system 1000 according to the embodiment of the present invention. The management system 100 is provided with two image forming apparatuses 102a and 102b, a server 103, and an analysis apparatus 105. In the following description, when it is unnecessary to distinguish the image forming apparatuses 102a and 102b, each of them is written as "the image forming apparatus 102".

The image forming apparatus 102 is an MFP (a multifunction peripheral) equipped with a plurality of functions, such as a scan function, a print function, and a copy function. The image forming apparatus 102 receives a function selection operation of a user and executes a job in response to a job execution instruction of the user, for example. It should be noted that jobs executable by the mage forming apparatus 102 include a scan job, a print job, a copy job, etc. Moreover, when mounting a facsimile function, the image forming apparatus 102 can execute a facsimile data transmission/reception process. It should be noted that the number of the image forming apparatuses that constitute the management system 100 is not limited to two. The management system 100 may be equipped with more image forming apparatuses.

The image forming apparatus 102t is connected with the server 103 through the networks 104, such as the Internet, and can be communicated with the server 103 and the analysis apparatus 105. The image forming apparatus 102 transmits status information data that are obtained from sensors etc. that manage and monitor various components implemented inside the apparatus and log data that is a job execution history to the server 103. It should be noted that details of the status information data and log data will be mentioned later.

The server 103 is a management apparatus that collects internal data showing the status of the image forming apparatus 102 from the image forming apparatus 102 and manages the image forming apparatus 102. The internal data includes the above-mentioned status information data and log data. Details of the internal data will be mentioned later. Moreover, the server 103 gives the obtained internal data to the analysis apparatus 105. Furthermore, the server 103 performs an interpolation process for a case where deficiency occurs in the internal data and a feature extraction process to the status information data.

The analysis apparatus 105 analyzes the internal data that the server 103 collects, generates maintenance information that predicts malfunctions and lives of various components mounted in the image forming apparatus 102, and outputs the generated maintenance information to the image forming apparatus 102. Moreover, when determining that there is possibility that a component will be out of order or a component is close to its end of life, the analysis apparatus 105 notifies a maintenance person 106 who is near an installation location of the image forming apparatus 102 of an instruction to perform maintenance. The maintenance person 106 visits the installation location of the image forming apparatus 102 and performs the maintenance. Thereby, the image forming apparatus 102 is maintainable in the state where a job is executable.

Figure 2:
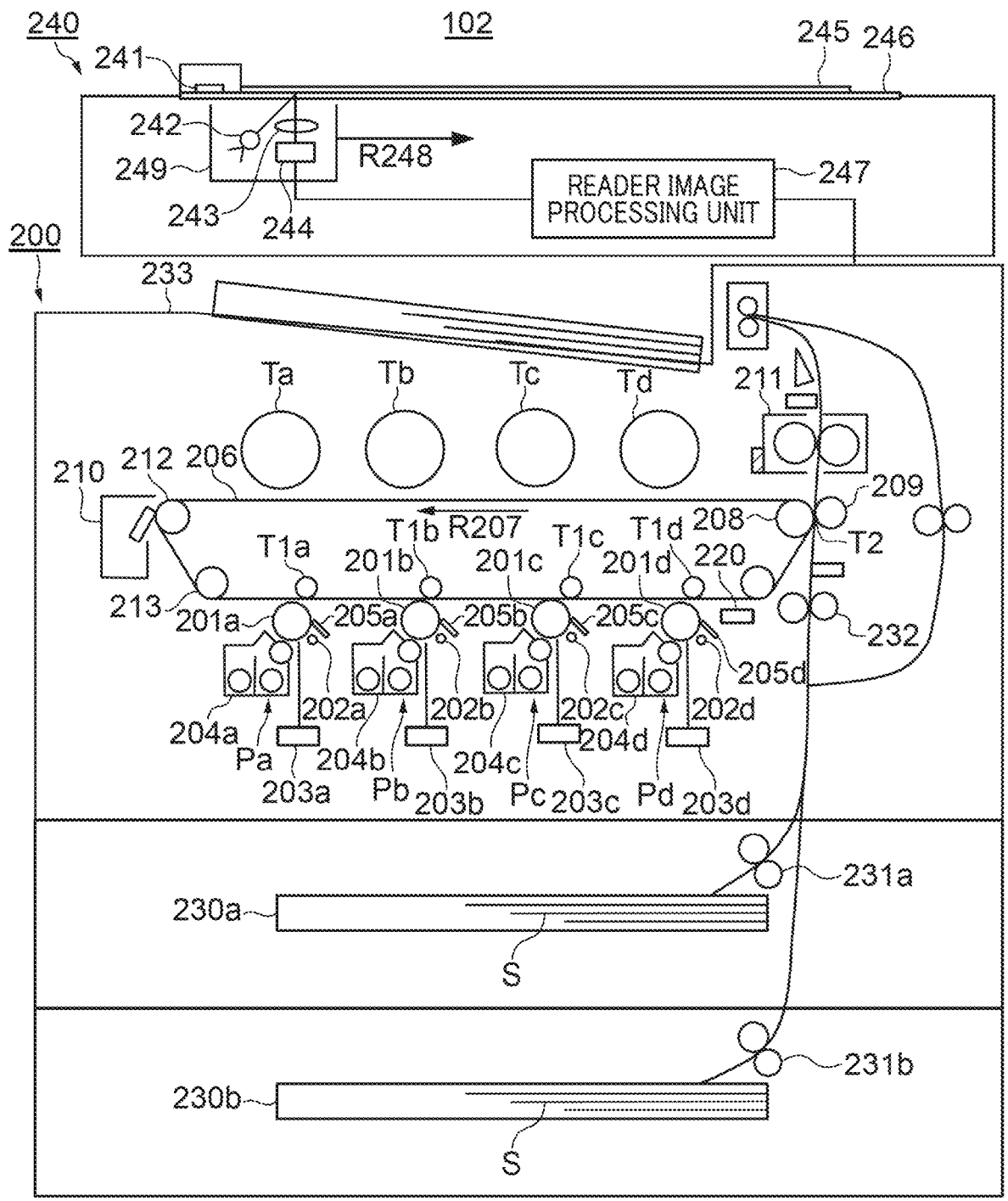
FIG. 2 is a view schematically showing a configuration of an image forming apparatus constituting the management system.

FIG. 2 is a view schematically showing a configuration of the image forming apparatus 102. The image forming apparatus 102 is a printer, a copying machine, a multifunction apparatus, or a facsimile machine that form a color image with an electrophotographic system. The image forming apparatus 102 is an image forming apparatus of an intermediate transfer tandem system in which four image forming units Pa, Pb, Pc, and Pd are arranged along an intermediate transfer belt 206. The image forming apparatus 102 has a printer unit 200 and a reader unit 240.

The printer unit 200 will be described first. Recording media S, such as sheets, on which images are formed, are stacked in sheet cassettes 230a and 230b, and are sent out towards a secondary transfer section T2 depending on image formation timings of the image forming units Pa through Pd with feed roller pairs 231a and 231b that employ a frictional separation method. The feed roller pairs 231a and 231b convey the recording media S to a registration roller pair 232 through a conveyance path. The registration roller pair 232 corrects skew of the recording medium S, adjusts timing, and conveys the recording medium S to the secondary transfer section T2.

In the printer unit 200, images are formed by the image forming units Pa through Pd. The image forming units Pa, Pb, Pc, and Pd respectively have photosensitive members 201a, 201b, 201c, and 201d, electrostatic chargers 202a, 202b, 202c, and 202d, exposure devices 203a, 203b, 203c, and 203d, development devices 204a, 204b, 204c, and 204d, primary transfer sections T1a, T1b, T1c, and T1d, and photosensitive-member cleaners 205a, 205b, 205c, and 205d. The electrostatic chargers 202a through 202d uniformly electrify the surfaces of the photosensitive members 201a through 201d, respectively. The photosensitive members 201a through 201d are drivingly rotated, and the exposure devices 203a through 203d respectively irradiate the photosensitive members 201a through 201d with light. The exposure devices 203a through 203d irradiate the photosensitive members 201a through 201d with light beams modulated according to image information of an image to form. Thereby, electrostatic latent images according to the image information are formed on the photosensitive members 201a through 201d.

The development devices 204a through 204d develop the electrostatic latent images formed on the photosensitive members 201a through 201d with developers (toners). That is, the development devices 204a through 204d develop the electrostatic latent images by making the toners adhere to the photosensitive members 201a through 201d, so that toner images are formed. Since pressures and electrostatic load biases are applied to primary transfer sections T1a, T1b, T1c, and T1d, the toner images are transferred to the intermediate transfer belt 206 from the photosensitive members 201a through 201d. In that time, the toner images formed on the photosensitive members 201a through 201d are transferred so as to be overlapped on the intermediate transfer belt 206.

The image forming unit Pa generates a yellow toner image. The image forming unit Pb generates a magenta toner image. The image forming unit Pc generates a cyan toner image. The image forming unit Pd generates a black toner image. However, the number of colors of toner images formed is not limited to four colors. Although each of the development devices 204a through 204d stores two-component developer that mixes non-magnetic toner and magnetic carrier, it may store one-component developer that consists of one of magnetic toner and non-magnetic toner.

Since the yellow, magenta, cyan, and black toner images are transferred to the intermediate transfer belt 206 in an overlapped fashion, a full color toner image is formed on the intermediate transfer belt 206. The toners that remain on the photosensitive members 201a through 201d after transferring the toner images to the intermediate transfer belt 206 are collected by photosensitive-member cleaners 205a through 205d. When amounts of the toners stored within the development devices 204a through 204d are less a predetermined amount, the toners will be supplied from toner bottles Ta, Tb, Tc, and Td that are replenishing containers of the developers.

The intermediate transfer belt 206 is an endless belt provided in an intermediate-transfer-belt frame (not shown) and is tensioned between a secondary transfer internal roller 208, a tension roller 212, and a secondary-transfer upstream roller 213. The intermediate transfer belt 206 is driven to rotate in a direction of an arrow R207 by the secondary transfer internal roller 208, the tension roller 212, and the secondary-transfer upstream roller 213. As the intermediate transfer belt 206 rotates, the full color toner image formed on the intermediate transfer belt 206 is conveyed to the secondary transfer section T2.

A density detection sensor 220 that detects toner density is arranged near the intermediate transfer belt 206. The density detection sensor 220 is arranged between the photosensitive member 201d and a secondary transfer external roller 209 in order to detect a toner pattern of each color formed on the intermediate transfer belt 206 when the toner density of each color is measured.

The recording medium S is conveyed so that the recording medium S meets the toner image formed on the intermediate transfer belt 206 at the secondary transfer section T2. The secondary transfer section T2 is a transfer nip section formed by the secondary transfer rollers (the secondary transfer internal roller 208 and secondary transfer external roller 209) arranged face to face. Since the secondary transfer section T2 applies pressure and electrostatic load bias, the toner image is adhered to the recording medium S. In this way, the secondary transfer section T2 transfers the toner image on the intermediate transfer belt 206 to the recording medium S. The toner that remains on the intermediate transfer belt 206 after transferring is collected by a transfer cleaner 210.

The recording material S to which the toner image has been transferred is conveyed by the secondary transfer external roller 209 from the secondary transfer section T2 to a fixing device 211. The fixing device 211 melts the toner image on the recording medium S and fixes the toner image to the recording medium S by giving predetermined pressure and heat to the recording medium S with rollers arranged face to face. The fixing device 211 is provided with a heater used as a heat source that is controlled so as to always maintain a suitable temperature. The recording medium S to which the toner image is fixed is discharged onto a discharge tray 233. When images are formed on both sides of the recording medium S, the recording medium S is reversed with a reversing conveyance mechanism and is conveyed to the registration roller pair 232.

Next, the reader unit 240 will be described. The reader unit 240 is a scanner that reads an image formed on a document 245. The document 245 is placed on an original platen 246 so as to face an image formed side to the original platen 246. When a copy job is executed, the reader unit 240 transmits image data showing a read image to the printer unit 200.

The reader unit 240 has a reading unit 249 and a reader image processing unit 247. The reading unit 249 consists of an emission unit 242, an optical system 243, and a light receiving unit 244 integrally. The reading unit 249 is a line sensor extended in the direction that intersects perpendicularly with a plane of FIG. 2. The reading unit 249 reads an image of the entire area of the document 245 while moving in a direction of an arrow R248. The emission unit 242 irradiates the document 245 with light. The light receiving unit 244 receives reflected light from the document 245 through the optical system 243 and transmits a light received result to the reader image processing unit 247.

The reader image processing unit 247 generates image data representing the image formed on the document 245 according to the light received result of the light receiving section 244. Moreover, the reader image processing unit 247 functions also as a sensor that measures density of the image formed on the document 245 according to the light received result of the light receiving section 244. The reader image processing unit 247 transmits the image data and the density of the image to the printer unit 200 through a system controller 300 mentioned later (see FIG. 3).

Figure 3:
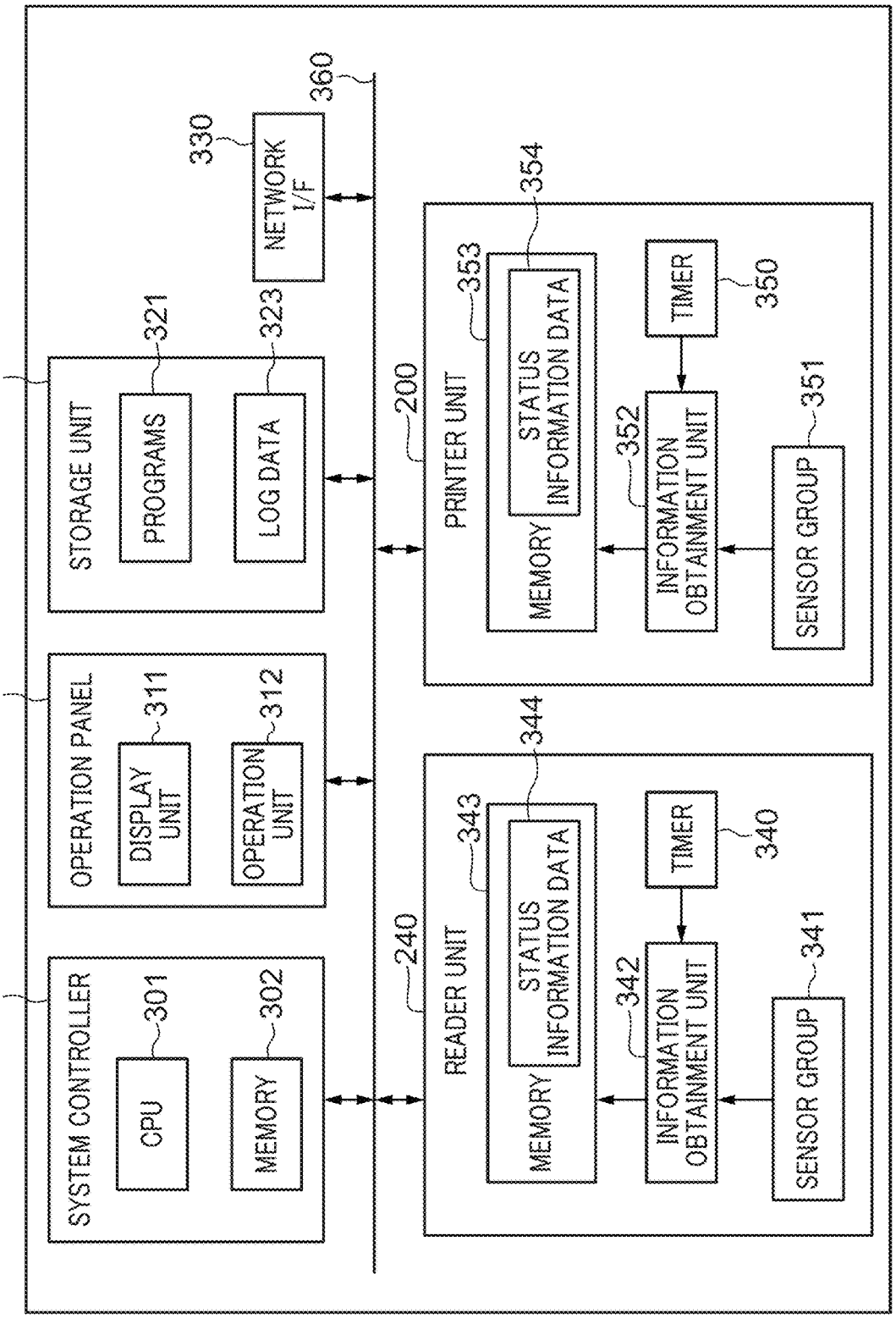
FIG. 3 is a block diagram showing a hardware configuration of the image forming apparatus.

Next, a hardware configuration of the image forming apparatus 102 will be described. FIG. 3 is a block diagram showing the hardware configuration of the image forming apparatus 102. The image forming apparatus 102 is provided with the system controller 300, an operation panel 310, a storage unit 320, a network I/F 330, the reader unit 240, and the printer unit 200. The units that constitute the image forming apparatus 102 are configured to exchange data through a data bus 360.

The system controller 300 has a CPU 301 and a memory 302 and totally controls operations of the units that constitute the image forming apparatus 102. The CPU 301 is a hardware processor that can run programs 321 stored in the storage unit 320. When power is supplied to the image forming apparatus 102, the CPU 301 controls the entire operation of the image forming apparatus 102 by reading the programs 321 from the storage unit 320 to the memory 302 and running them. The CPU 301 runs the programs 321 to communicate with the reader unit 240 and printer unit 200, and obtains status information data 344 and 354 from the reader unit 240 and printer unit 200, and transmits them to the server 103 together with log data 323 stored in the storage unit 320. The details will be mentioned later.

The memory 302 temporarily stores data etc. that are used when the CPU 301 executes the process based on the programs 321. The memory 302 temporarily stores internal data transmitted to the server 103 from the image forming apparatus 102. The details will be mentioned later.

The operation panel 310 has a display unit 311 and an operation unit 312. The display unit 311 is constituted by a color liquid crystal display, for example, displays various screens that are operatable by a user or the maintenance person 106, and displays information required for maintenance. The operation unit 312 is constituted by a touch panel key arranged on the screen of the display unit 311, for example, and receives operations by the user or the maintenance person 106.

The storage unit 320 is a nonvolatile storage unit that is constituted by a hard disk drive (HDD), for example. The storage unit 320 stores the various kinds of programs 321 that the CPU 301 runs and the log data 323. The log data 323 record execution histories of jobs in the image forming apparatus 102 and include detailed information about the executed jobs and the execution dates of the jobs. The network I/F 330 connects the image forming apparatus 102 to the network 104. The image forming apparatus 102 communicates with the server 103 through the network I/F 330.

The reader unit 240 has a sensor group 341, an information obtainment unit 342, a memory 343, and a timer 340. The sensor group 341 has a plurality of sensors that monitor operation states of movable components that operate when the reader unit 240 reads a document, and executes predetermined measurement based on requests from the system controller 300.

The information obtainment unit 342 is a controller of the reader unit 240, and its operations are set up by the CPU 301. The information obtainment unit 342 obtains sensor measured values that are measurement results that the sensor group 341 measures operation states of predetermined movable components. The information obtainment unit 342 generates status information data 344 by combining the obtained sensor measured values and timing information that is measurement date and time obtained from the timer 340, and stores the data 344 into the memory 343 temporarily. Moreover, the memory 343 temporarily stores a scan count value that is a count number (the number of times of scans of documents) counted by a scan counter (not shown) provided in the reader unit 240. The status information data 344 and the scan count value that are stored in the memory 343 are transmitted to the system controller 300 from the reader unit 240 in response to an instruction from the CPU 301. The timer 340 sets up an operation timing of the information obtainment unit 342 in response to a signal from the system controller 300.

The printer unit 200 has a sensor group 351, an information obtainment unit 352, a memory 353, and a timer 350. The sensor group 351 includes a plurality of sensors that monitor operation states of movable components that operate when the printer unit 200 performs an image forming process. Moreover, the sensor group 351 executes predetermined measurements in response to requests from the system controller 300.

The information obtainment unit 352 is a controller of the printer unit 200, and its operations are set up by the CPU 301. The information obtainment unit 352 obtains sensor measured values that are measurement results that the sensor group 351 measures operation states of the predetermined movable components. The information obtainment unit 352 generates status information data 354 by combining the obtained sensor measured values and timing information that is measurement date and time obtained from the timer 350, and stores the data 354 into the memory 353 temporarily. Moreover, the memory 353 temporarily stores a print count value that is a count number (the number of sheets of printed recording media S) counted by a print counter (not shown) provided in the printer unit 200. The status information data 354 and the scan count value that are stored in the memory 353 are transmitted to the system controller 300 from the printer unit 200 in response to an instruction from the CPU 301. The timer 350 sets up an operation timing of the information obtainment unit 352 in response to a signal from the system controller 300.

The information obtainment unit 342 (352) switches a storing method of the status information data 354 (355) at the next timing in accordance with whether the status information data 344 (354) in the memory 343 (353) can be transmitted to the system controller 300 at the predetermined timing. The details of switching of the storing method of the status information data 344 (354) will be mentioned later.

Since the scan count value and print count value respectively show the statuses of the reader unit 240 and printer unit 200, the count values shall be included in the status information data 344 and 354 for convenience of the following description.

Figure 4:
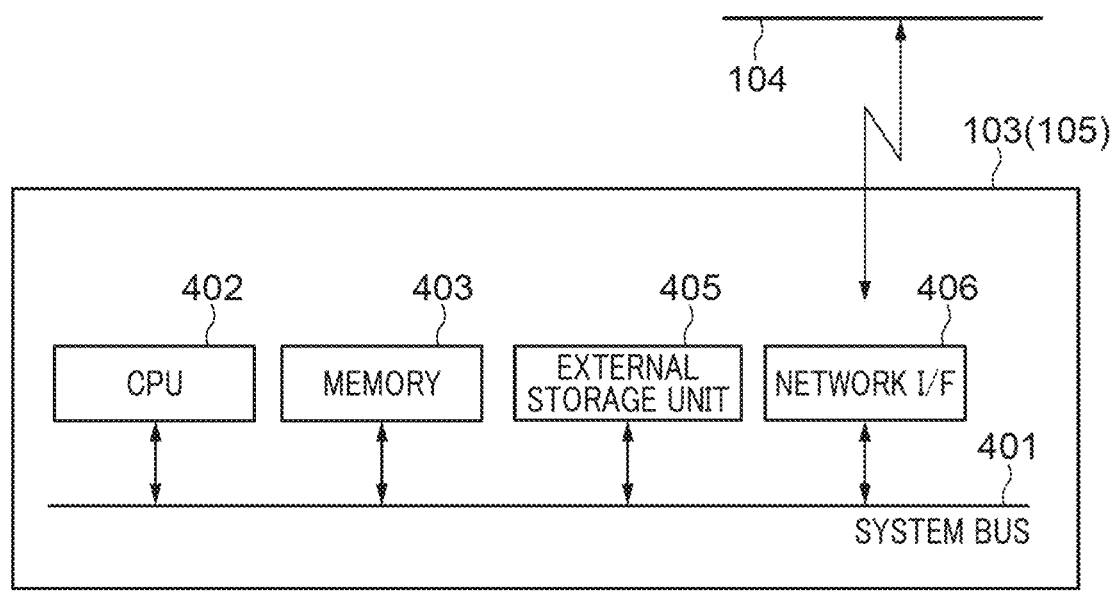
FIG. 4 is a block diagram showing a hardware configuration of a server in the management system.

FIG. 4 is a view showing the hardware configuration of a controller of the server 103. The server 103 has a CPU 402, a memory 403, an external storage unit 405, and a network I/F 406 that are communicatively connected through a system bus 401 mutually.

The CPU 402 is a central processing unit that controls the entire operations of the server 103. The memory 403 includes a nonvolatile memory and volatile memory, and stores a boot program for the CPU 402, various kinds of data, etc. The external storage unit 405 is a large capacity storage unit of which the capacity is larger than that of the memory 403 and is an HDD, for example. The external storage 405 stores a control program of the server 103 that the CPU 402 runs. It should be noted that the external storage unit 405 is not limited to the HDD and may be a solid state drive (SSD) etc. that have a function equivalent to the HDD.

The CPU 402 runs the boot program stored in the memory 403 at the start-up (power ON) of the server 103. The boot program is used to read the control program stored in the external storage unit 405 and to develop it on the memory 403. The CPU 402 runs the control program developed on the memory 403 after execution of the boot program, and starts controlling the server 103. Moreover, the CPU 402 stores data used during execution of the control program on the memory 403 and reads and writes the data. The external storage unit 405 can store various set values required during execution of the control program. The CPU 402 reads and writes the various set values. Furthermore, the CPU 402 communicates with external devices connected to the network 104 through the network I/F 406. For example, the CPU 402 can store internal data received from the image forming apparatus 102 through the network I/F 406 into the external storage unit 405, and can share the display screen information of the operation panel 310.

Since a hardware configuration of a controller of the analysis apparatus 105 is equivalent to the hardware configuration of the controller of the server 103, its description is omitted.

Figure 5A:
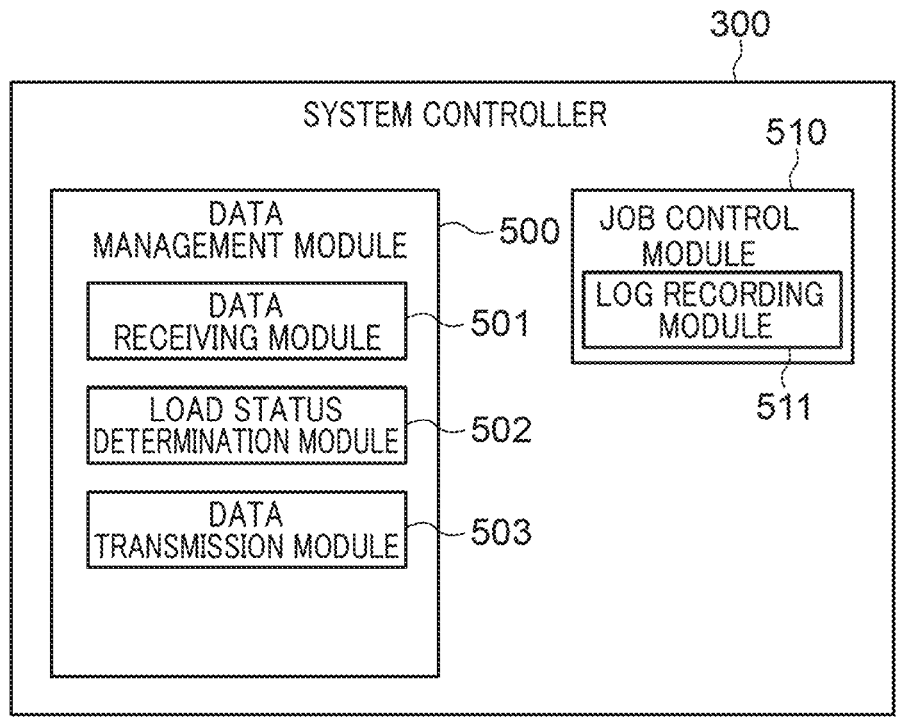
FIG. 5A and FIG. 5B are block diagrams showing functional configurations of a system controller and a printer unit, respectively.
Figure 5B:
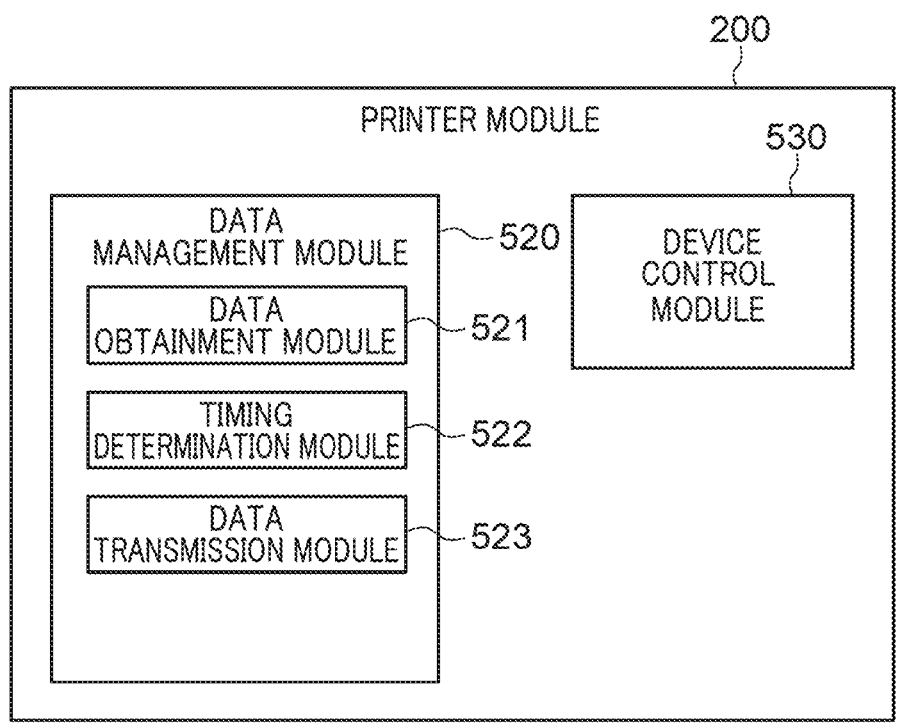

FIG. 5A is a block diagram showing a functional configuration of the system controller 300 of the image forming apparatus 102. FIG. 5B is a block diagram showing a functional configuration of the printer unit 200 of the image forming apparatus 102. First, the system controller 300 is described. In the description, the control that the system controller 300 executes to the printer unit 200 is described.

In the system controller 300, the CPU 301 functions as a data management module 500 and job control module 510 by running the programs 321. The job control module 510 controls execution of a job in the image forming apparatus 102. Moreover, the job control module 510 controls execution of the job designated by the user or the maintenance person 106 by communicating with the printer unit 200 and controlling the operations. The job control module 510 has a log recording module 511. When the job designated by the user or the maintenance person 106 has been executed, the log recording module 511 stores its execution history to the storage unit 320 as log data 323.

The data management module 500 has a data receiving module 501, a load status determination module 502, and a data transmission module 503. In a state where the load concerning the information process of the CPU 301 is large because the job control module 510 is executing the job, the priority is given to execution of the job. And the priority of the process as the data management module 500 is decreased, so that the CPU 301 controls to complete the job normally.

Accordingly, the load status determination unit 502 determines the state of the load of the CPU 301 depending on an operation situation of the job control module 510. When the load status determination unit 502 determines that the CPU 301 is not executing a large load process (hereinafter referred to as "the load of the CPU 301 is small"), a transfer request of the status information data 354 is transmitted to the printer unit 200. In response to this, the data receiving module 501 receives the status information data 354 from the printer unit 200. The status information data 354 that the data receiving module 501 received is temporarily stored in the memory 302 as internal data to which the log data 323 read from the storage unit 320 are combined.

In the meantime, when the load status determination unit 502 determines that the CPU 301 is executing a large load process (hereinafter referred to as "the load of the CPU 301 is large"), it is controlled so as not to increase the load of the CPU 301. Specifically, when the load of the CPU 301 is large, the data receiving module 501 is controlled to reduce the receipt of the status information data 354 and the reading of the log data 323 from the storage unit 320.

When the load status determination unit 502 determines that the load of the CPU 301 is small, the data transmission module 503 transmits the internal data stored in the memory 302 to the server 103. In the meantime, when the load status determination unit 502 determines that the load of the CPU 301 is large, the data transmission module 503 restrains the transmission of the internal data to the server 103 so as not to increase the load of the CPU 301.

Next, the printer unit 200 will be described. The information obtainment unit 352 of the printer unit 200 functions as a data management module 520 and device control module 530. The device control module 530 executes the job designated by the system controller 300 by controlling operations of movable components, such as the image forming units Pa through Pd, that constitute the printer unit 200. The data management module 520 manages the sensor measured values measured by the sensor group 351 implemented inside the printer unit 200 and the print count value.

The data management module 520 has a data obtainment module 521, a timing determination module 522, and a data transmission module 523. The data obtainment module 521 obtains the sensor measured values measured by the sensor group 351 when the timing determination module 522 determines that a predetermined timing defined by the timer 350 has come. At this time, the data obtainment module 521 generates the status information data 354 by combining the obtained sensor measured values with the timing information that shows the measurement date and time, and stores it into the memory 353. The predetermined timing defined by the timer 350 may come every definite period of several milliseconds or several seconds or may be timings before and after performing the job instructed by the user or the maintenance person 106. The data transmission module 523 transmits the status information data 354 to the data receiving module 501, when the transfer request of the status information data 354 is received from the system controller 300.

Since the functional configuration of the reader unit 240 is equivalent to that of the printer unit 200, the description and showing in the drawings are omitted. However, the device control module of the reader unit 240 controls the movable components like the reading unit 249 and arithmetic processing units like the reader image processing unit 247. Moreover, the data obtainment module 521 obtains the sensor measured values measured by the sensor group 341 provided in the reader unit 240. Furthermore, the status information data 354 is transmitted to the system controller 300 in place of the status information data 344.

FIG. 6A is a view describing contents of the status information data 354 generated in the printer unit 200. In the status information data 354, a data ID and a priority 602 are assigned for each data item 601 showing a measurement object. Then, the system controller 300 manages the sensor measured value which the data obtainment module 521 obtains for each data item 601. The sensor measured value is stored in the memory 353 in association with pieces of timing information 603 (603a, 603b, 603c, . . . ) that are measurement dates and times of the sensor measured value for each data item 601. It should be noted that a storing state of the status information data 354 in the memory 353 is mentioned later by referring to FIG. 7, FIG. 8A, and FIG. 8B.

For example, as a fixing unit temperature of which the data ID set in the data item 601 is "1", a measurement result that a temperature sensor that measures the temperature of the fixing unit 211 measures 250 degrees Celsius at 1:01:0 on Jan. 1, 2020 shown at the timing information 603a is recorded. Moreover, a measurement result that 2013 rpm is measured as a rotational speed of a belt motor that drives the intermediate transfer belt 206, and a measurement result that 3.5 m is measured as a travel distance of the secondary transfer roller are recorded at the same time. Then, a density value of 980 that is obtained by quantizing a voltage obtained by the density detection sensor 220 into 10 bits (0 through 1023) is recorded at the same time.

The priority 602 defines an order of data that should be obtained and stored preferentially. The priority 602 is set for every data item 601 beforehand. A numeral "1" of the priority 602 shows the highest priority. The priority decreases as the numeral increases. The high priorities 602 are given to the data items 601, such as an item that precludes the image formation when a value becomes abnormal like the fixing unit temperature and an item that is directly related to a malfunction of the image forming apparatus. In this embodiment, the priority 602 of the fixing unit temperature is set to "1".

In the meantime, the low priorities 602 are given to the data items 601, such as an item that has small possibility to preclude the use of the image forming apparatus even if a value becomes abnormal like the toner density and an item that is not directly related to a malfunction of the image forming apparatus. That is, when the toner density becomes abnormal, although a defect that thins or thickens an image formed on the recording medium S may be occurs, such a defect does not preclude the use of the image forming apparatus promptly. Accordingly, the priority 602 of the toner density is set to "3".

A low priority 602 may be given to a data item 601 of which a feature can be extracted at high accuracy even when sensor measured values used as source data of a feature extraction process (mentioned later) executed by the system controller 300 include a defective value. Moreover, a priority 602 of a data item 601 that can interpolate a defective value at a high accuracy can be changed according to an accumulation state of the status information data 354 during the operation of the management system 100.

The priority 602 is used when a part of the status information data 354 is forced to discard. In such a case, the priority 602 is used to determine the data item 601 of which the status information data 354 is preferentially kept. For example, the memory 353 of the printer unit 200 has only necessary minimum memory capacity in order to hold down product cost in general. Accordingly, it is necessary to transmit the status information data 354 stored in the memory 353 to the system controller 300 before the free space of the memory 353 runs short.

However, the system controller 300 is bearing not only the data management but also the job control of the image formation and the device control in connection with the job control. Accordingly, if the status information data 354 is transmitted from the printer unit 200 to the system controller 300 during a high load period of the CPU 301 because of execution of a job process, transmission and reception of the status information data 354 may fail.

As a result, since the status information data 354 are accumulated in the memory 353 as time elapses, the free space may be insufficient or drained. In such a case, a part of the status information data 354 stored in the memory 353 is forced to discard (eliminate). In that time, the priority 602 is used as a criterion for determining a data item 601 of which data (sensor measured values) are discarded. For example, a process that keeps the data of which the value of the priority 602 is "1" or "2" and discards the data of which the value of the priority 602 is "3" is available. Details of discarding of the data according to the priority 602 will be mentioned later.

It should be noted that the information obtainment unit 342 of the reader unit 240 generates the status information data 344 constituted like FIG. 6A by combining the sensor measured values obtained from the sensor group 341 with the timing information. The status information data 344 is once stored in the memory 343 and then, is transmitted to the system controller 300 at a predetermined timing.

FIG. 6B shows a definition table that prescribes information contents that are used when the server 103 applies a predetermined process to the internal data transmitted to the server 103 from the system controller 300. Although the definition table is stored in the storage unit 320 of the image forming apparatus 102, it is used for the feature extraction process of the server 103. Accordingly, the CPU 402 of the server 103 obtains the definition table from the image forming apparatus 102 and stores it to the external storage unit 405.

The image forming apparatus 102 is preferably designed to display the definition table on the display unit 311 in response to an operation to the operation unit 312 so that the maintenance person 106 can check the priority 602 in the definition table. Moreover, since the priorities 602 in the definition table may be changed as mentioned later, the definition table may be configured to keep a change history of a priority 602 so that the maintenance person 106 can know the change history of the priority 602.

The internal data consist of the log data 323, the status information data 344 (the scan count value is included), and the status information data 354 (the print count value is included), as mentioned above. In the following description, when the status information data 344 and the status information data 354 are not distinguished, they are expressed by the "status information data" without attaching the reference numeral.

The data items 601 are set also to the scan count value, print count value, and log data 323, respectively. Moreover, a data obtainment source 605, a data type 606, a feature extraction process 607, an interpolation process 608, an allowable error 609, and an interpolation propriety flag 610 are defined for each data item 601.

The data obtainment source 605 shows a part of the image forming apparatus 102 from which data is obtained for each data item 601. The data type 606 shows a data attribute for each data item 601. The feature extraction process 607 shows a type of a process defined to extract a feature for each data item 601. The server 103 generates the feature extraction data by applying the process defined in the feature extraction process 607 for the data of each data item 601. Details of the feature extraction data will be mentioned later. The interpolation process 608 defines the contents of the interpolation process executed to interpolate defective data when a deficiency occurs in the status information data for each data item 601.

It should be noted that the interpolation process is also executed by the server 103. The allowable error 609 prescribes an allowable range of an interpolation error that occurs by performing the interpolation process defined in the interpolation process field 608. The interpolation propriety flag 610 shows the determination result of whether the interpolation process that can keep the interpolation error that occurs in the interpolation process within the range of the allowable error 609 can be performed.

FIG. 7 is a schematic view showing the status information data 354 stored in the memory 353 of the printer unit 200 at a predetermined time T. The status information data 354 mainly consist of the sensor measured values 702 obtained from the sensor group 351 and are stored in the memory 353 as time series data considering the priority 602. Specifically, the status information data 354 consist of the data ID 601 and the priority 602 that are described by referring to FIG. 6A, the sensor measured value 702 and the timing information 603 that correspond to the data ID 601. The status information data 354 are stored in the predetermined addresses 701 on the memory 353. In this way, it is able to check the measured time and the source of the sensor measured value in the printer unit 200. Moreover, the status information data 354 are divided into groups corresponding to the priorities 602 and are stored in different address regions of the memory 353. This is because the data can be discarded from the data of which the priorities 602 are low when a part of the status information data 354 is forced to discard.

Figure 13:
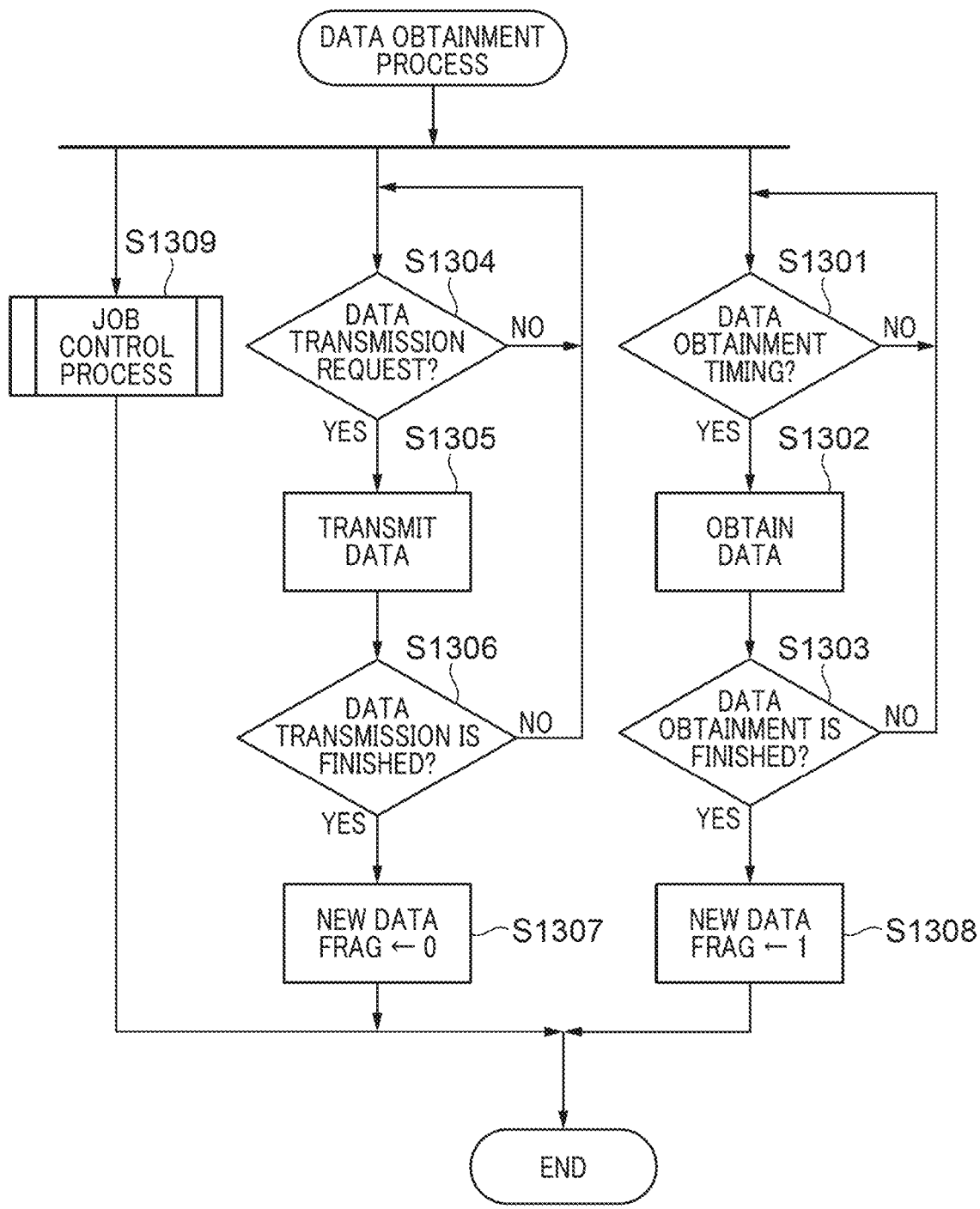
FIG. 13 is a flowchart showing a data obtainment process executed by the printer unit of the image forming apparatus.

FIG. 8A is a schematic view showing the status information data 354 stored in the memory 353 of the printer unit 2001 at the time after elapsing 10 minutes from the predetermined time T. FIG. 8A shows a case where the status information data 354 in FIG. 7 that were stored in the memory 353 at the time T have been transferred to the data management module 500 from the memory 353 (a case where a value of a new data flag mentioned later by referring to FIG. 13 is "0 (zero)"). The data stored in the predetermined address regions corresponding to the priorities 602 are overwritten by the status information data 354 newly obtained from the sensor group 351 after the time T. The memory 353 stores the new status information data 354.

FIG. 8B is a schematic view showing the status information data 354 stored in the memory 353 of the printer unit 2001 at the time after elapsing 20 minutes from the predetermined time T. FIG. 8B shows a case where the status information data 354 in FIG. 8A that were stored in the memory 353 at the time T+10 minutes have not been transferred to the data management module 500 from the memory 353 due to some reason (a case where a value of the new data flag mentioned later by referring to FIG. 13 is "1").

In this case, if the data in the memory 353 are overwritten by the new data sequentially from the address 0 like the case of transition from FIG. 7 to FIG. 8A, the high priority data that have not been transferred to the data management module 500 are discarded. Accordingly, as shown in FIG. 8B, the new data of which the priorities are "1" are stored in the address region started from the address 2000 in which the data of which the priorities are "3" will be inherently stored in order to keep the high priority data. In the example in FIG. 8B, the data of the toner density (data ID: 2001) stored in the addresses 2000 through 2003 in FIG. 8A are overwritten by the data of the fixing unit temperature (data ID: 1) and the intermediate-transfer-belt motor rotational velocity (data ID: 2). Even if new data of which priorities 602 are "1" cannot be stored after the above-mentioned overwriting, the new data of '1', the new data of which the priorities are "1" are stored in the address region started from the address 1000 in which the data of which the priorities are "2" will be inherently stored.

By performing such a process, it becomes available to achieve the process which does not discard the high priority data. The data discarding method according to the priority 602 is not limited to the above-mentioned simple method, a more complicated process can be employed.

Incidentally, although a collection rate of the high priority data increases by the method for overwriting the low priority data with the high priority data, a collection rate of the low priority data 602 may decrease. As a result, the internal state of the image forming apparatus 102 cannot be grasped exactly. That is, the data of the data item 601 that is low in the priority 602 are information required to grasp the internal state and to keep the image forming apparatus 102 in a proper state. Accordingly, in order to grasp the state of the image forming apparatus 102 more exactly, it is necessary to collect data at good balance while considering the priority 602. The control of the management system 100 to achieve this will be described hereinafter.

Figure 9:
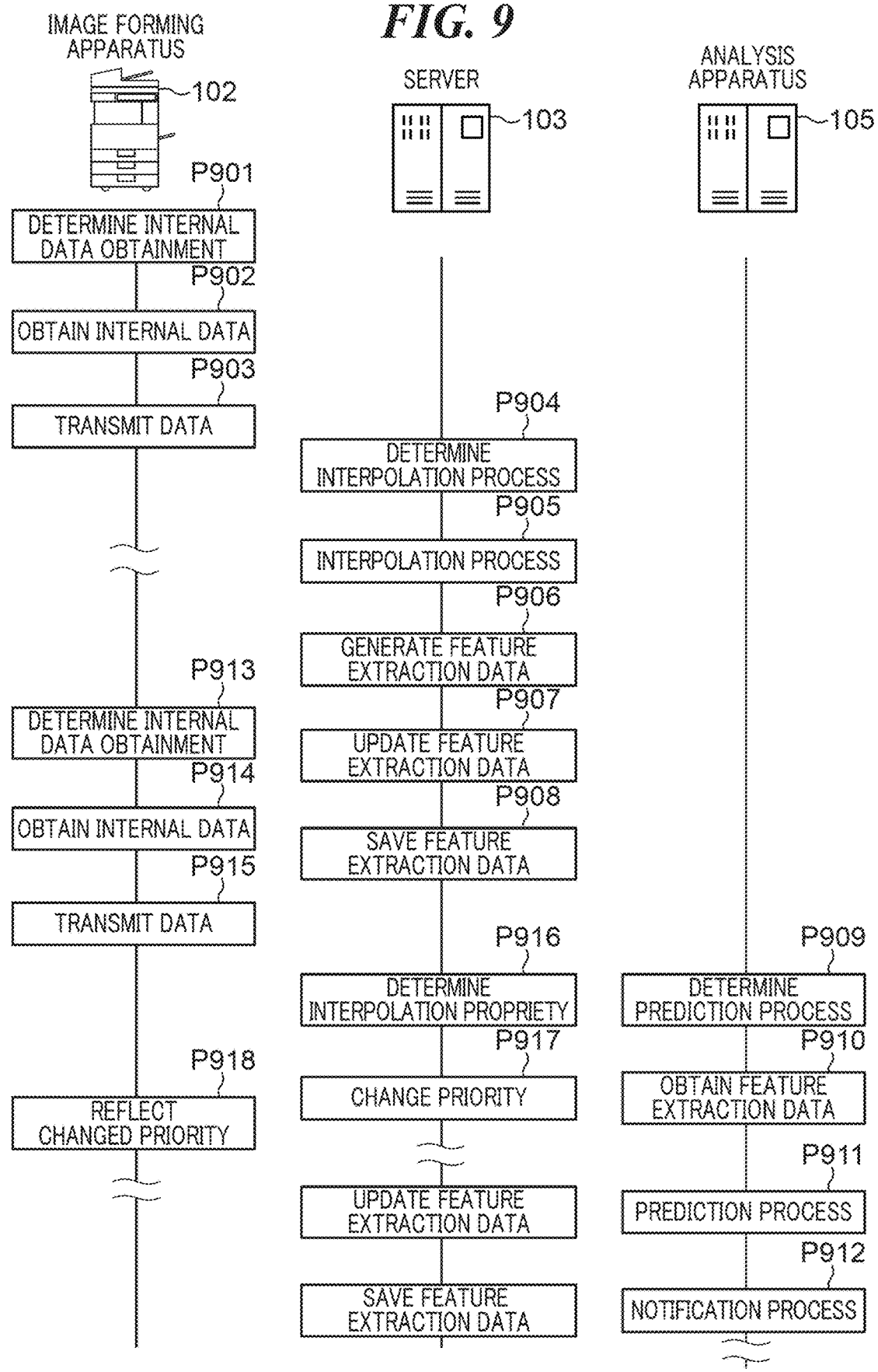
FIG. 9 is a view describing an entire process flow of the management system.

FIG. 9 is a view describing an entire process flow of the management system 100. Details of processes that are characteristic features of the present invention among the steps (processes) indicated by P-numbers in FIG. 9 will be described suitably.

At the beginning, the system controller 300 (the CPU 301) of the image forming apparatus 102 performs an internal-data-obtainment determination process on the basis of the load status of the CPU 301 (P901). In the internal-data-obtainment determination process in P901, the system controller 300 determines whether obtaining the status information data 344 and 354 from the reader unit 240 and the printer unit 200, reading the log data 323 from the storage unit 320, and storing the data temporarily in the memory 302.

When the system controller 300 determines to obtain the status information data as the determination result in P901, an internal-data obtainment process (P902). Specifically, the system controller 300 obtains the status information data 344 and 354 from the memories 353 and 343 of the printer unit 200 and the reader unit 240, reads the log data 323 from the storage unit 320, and stores them temporarily in the memory 302. In this way, the internal data for transmitting to the server 103 are temporarily stored in the memory 302. Next, the system controller 300 transmits the internal data in the memory 302 to the server 103 through the network 104 (P903).

After that, in the image forming apparatus 102, the system controller 300 repeats processes equivalent to P901 through P903 at predetermined timings. That is, the system controller 300 repeats a series of the processes to determine whether the internal data is obtained (P913), to obtain the status information data etc. (P914), and to transmit the data to the server 103 (P915).

When the server 103 receives the internal data from the image forming apparatus 102, the CPU 402 of the server 103 determines whether the interpolation process will be performed by checking the timing information 603 (P904). It should be noted that the CPU 402 of the server 103 is denoted as "CPU402_S" and the CPU 402 of the analysis apparatus 105 is denoted as "CPU 402_A" to distinguish them in the following description.

When deficiency or misorder occurs in values of the timing information 603, the CPU 402_S determines that the status information data is not obtained normally, and determines to perform the interpolation process. In the interpolation process, a series of data are generated by interpolating an abnormal portion of the data with linear interpolation using normal data, for example (P905). The interpolation process of such defective data can be performed using the methods generally called HotDeck imputation and Cold-Deck imputation. When all the data are normal, the interpolation process of P905 is not performed. If there are a plurality of same data of the same time, only one datum is left.

In the server 103, after that, the CPU 402_S performs the feature extraction process in association with the status information data about the image forming apparatuses 102 that constitute the management system 100, and generates feature extraction data (P906). The CPU 402_S updates the feature extraction data by adding the generated feature extraction data to the existing feature extraction data (P907). Then, the CPU 402_S saves the updated feature extraction data about the image forming apparatuses 102 that constitute the management system 100 (P908).

Furthermore, the CPU 402_S in the server 103 performs the interpolation-propriety determination process that determines whether an amount of data (hereinafter referred to as "basic data") that is needed to generate interpolation data is enough to confine an interpolation error within an allowable error range (P916). When determining that there are enough amount of basic data, the CPU 402_S performs a priority change process that decreases the priority 602 set to the data item 601 corresponding to the basic data, and notifies the image forming apparatuses 102 of the result (P917). When receiving the notification to change the priority 602 from the server 103, the image forming apparatus 102 performs a change reflection process to change the priority 602 (P918).

In the analysis apparatus 105, the CPU 402_A determines whether a timing to perform a prediction process that obtains information about the maintenance of the image forming apparatus 102 has come (P909). When determining that the timing to perform the prediction process has come, the CPU 402_A accesses the server 103 through the network 104 and obtains the feature extraction data required for the prediction process (P910).

After that, in the analysis apparatus 105, the CPU 402_A executes the prediction process that is associated with each feature extraction data using the feature extraction data (P911). The prediction process predicts a maintenance time, for example. Then, when the CPU 402_A determines that the image forming apparatus 102 is in a maintenance state that needs a predetermined notification to a user or the maintenance person 106 as the result of the prediction process, the CPU 402_A performs a notification process that notifies the image forming apparatus 102 of the maintenance state (P912). Also, in the server 103 and the analysis apparatus 105, the above-mentioned series of processes are repeated.

The details of the interpolation-propriety determination process (P916) and the priority change process (P917) executed in the server 103 will be described.

Figure 10A:
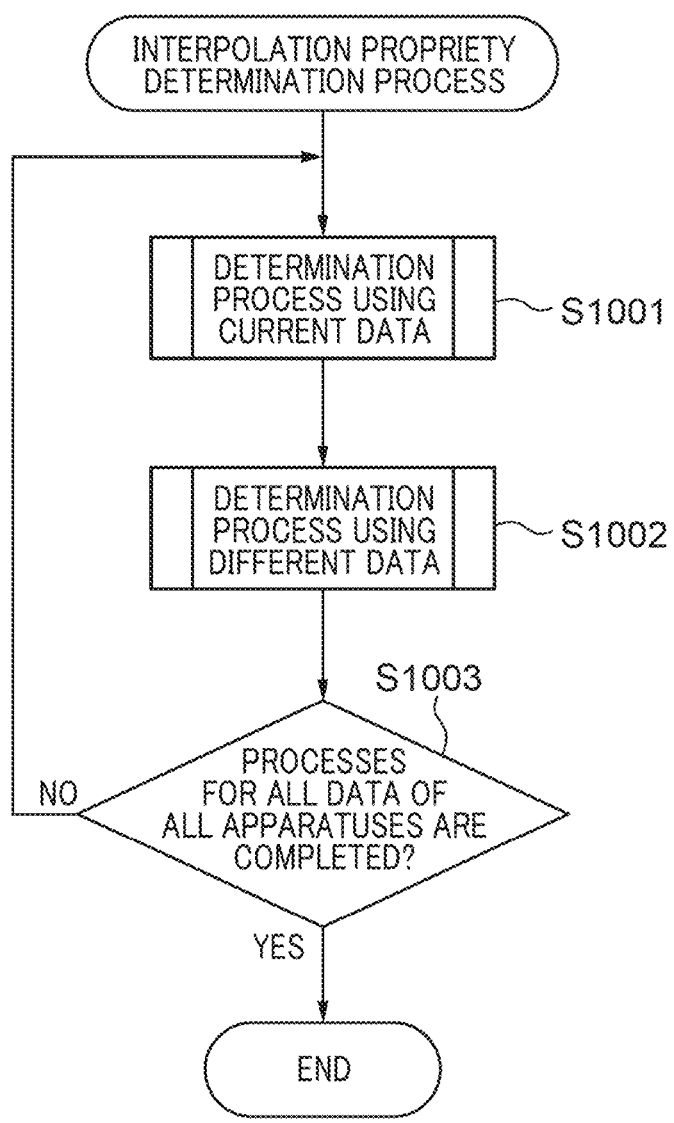
FIG. 10A is a flowchart describing an interpolation-propriety determination process of P916 in FIG. 9.

The details of the interpolation-propriety determination process (P916) is described first. FIG. 10A is a flowchart showing the interpolation-propriety determination process. Process shown by S-numbers (steps) in the flowchart in FIG. 10A are achieved when the CPU 402_S runs the predetermined program stored in the memory 403. Moreover, the interpolation-propriety determination process is performed for each data item 601 of the status information data obtained from all the image forming apparatuses 102 connected to the server 103.

In S1001, the CPU 402_S performs a determination process to determine whether the interpolation process can be applied to the status information data (defective sensor measured value etc.) of the image forming apparatus that is a current target. The determination process in S1001 is performed assuming that the data do not accumulate in the future about the status information data that is subjected to the interpolation process. In addition, the propriety of the interpolation process is determined depending on whether the interpolation error is equal to or less than a predetermined value (allowable error) in a case where a part in which no data is accumulated is interpolated on the basis of the basic data accumulated until starting the interpolation-propriety determination process.

Figure 10B:
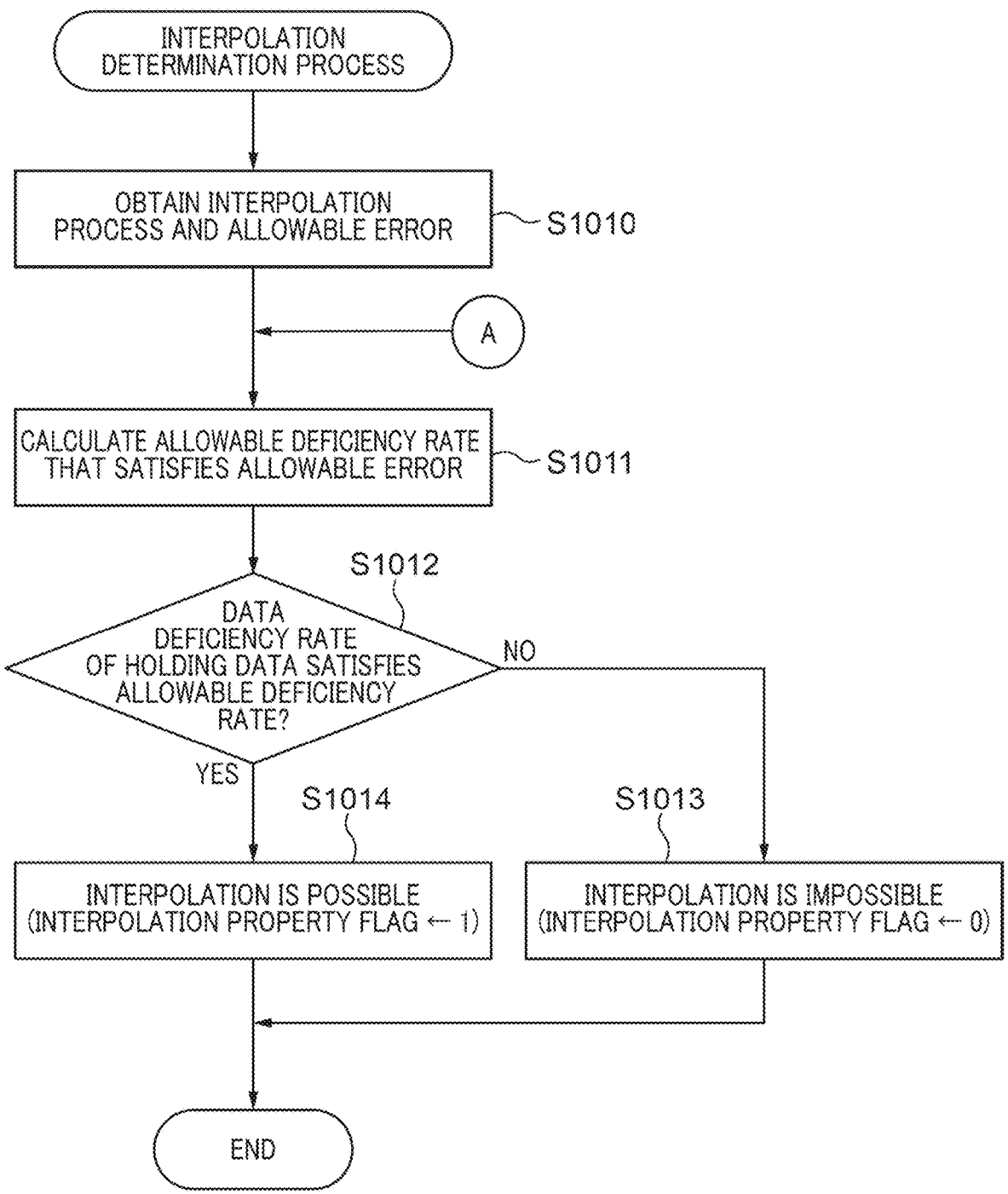
FIG. 10B is a flowchart describing a determination process of S1001 in FIG. 10A.
Figure 11:
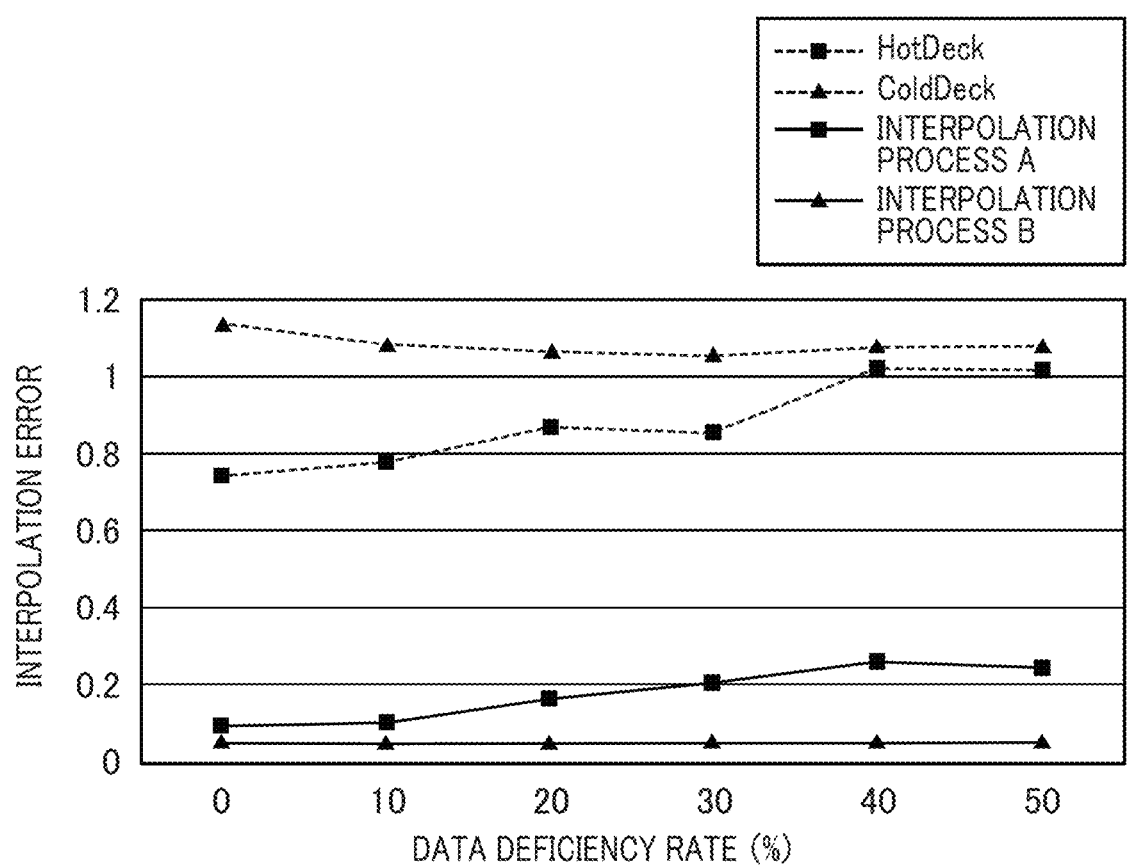
FIG. 11 is a graph showing relations between a deficiency rate and an absolute error.

FIG. 10B is a flowchart showing the determination process in S1001 in detail. In the determination process in S1001, the CPU 402_S first reads in S1010 the interpolation process and allowable error that are associated with the data item 601 prescribed in the definition table in FIG. 6B. In S1011, the CPU 402_S obtains an allowable value of a data deficiency rate (an allowable deficiency rate) for attaining the allowable error. The data deficiency rate means a rate of defective data to the obtained status information data (sensor measured values etc.). FIG. 11 is a graph showing relations between the data deficiency rate and the interpolation error. As shown in FIG. 11, the relations between the data deficiency rate and the interpolation error are calculated by a simulation etc. in advance for the interpolation processes. The CPU 402_S obtains an allowable deficiency rate from this graph.

In S1012, the CPU 402_S determines whether the data deficiency rate of the obtained status information data satisfies the allowable deficiency rate obtained in S1011. When determining that the data deficiency rate does not satisfy the allowable deficiency rate (the data deficiency rate is more than the allowable deficiency rate (NO in S1012)), the CPU 402_S proceeds with the process to S1013. The CPU 402_S determines that the interpolation process cannot be performed and sets the interpolation propriety flag 610 that is associated with the data item 601 managed in the definition table in FIG. 6B to "0 (zero)" in S1013, and thereby, finishes this process.

In the meantime, when determining that the data deficiency satisfies the allowable deficiency rate (the data deficiency rate is equal to or less than the allowable deficiency rate (YES in S1012)), the CPU 402_S proceeds with the process to S1014. The CPU 402_S determines that the interpolation process can be performed and sets the interpolation propriety flag 610 that is associated with the data item 601 managed in the definition table in FIG. 6B to "1" in S1014, and thereby, finishes this process.

When the CPU 402_S finishes the process in S1001 for one data item 601, the process proceeds to S1002. In S1002, the CPU 402_S determines whether the interpolation process can be performed using different status information data other than the current data of the same apparatus or status information data of another apparatus.

Figure 12A:
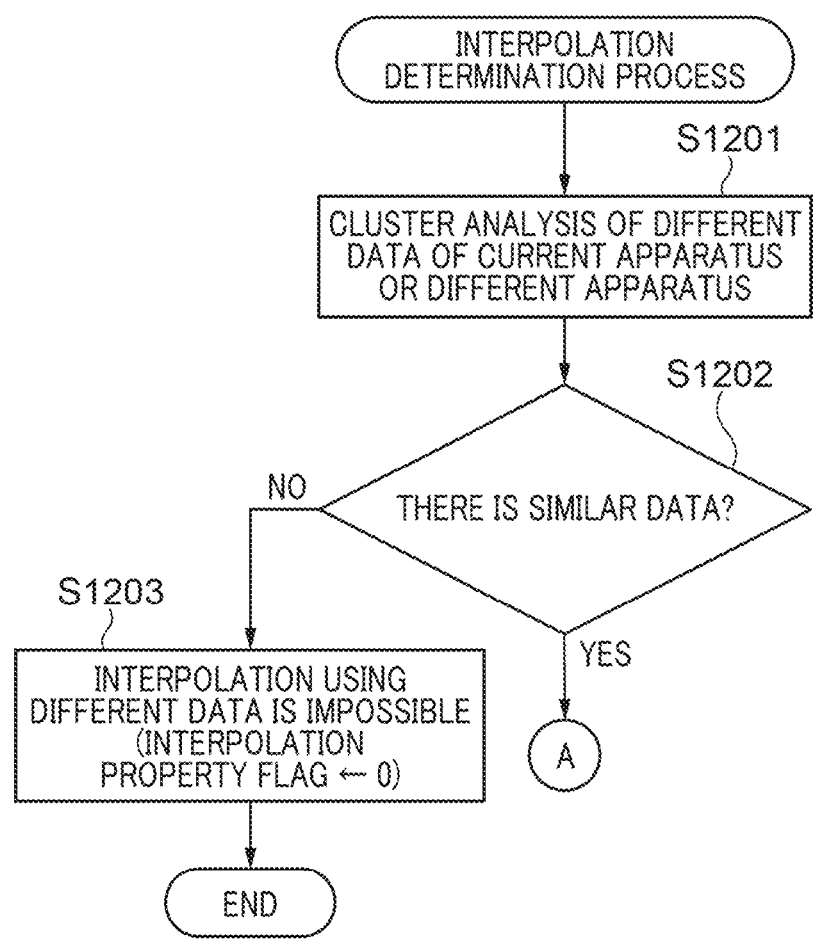
FIG. 12A is a flowchart showing an interpolation determination process of S1002 in FIG. 10A.

FIG. 12A is a flowchart showing the interpolation determination process in S1002 that uses the different data. In S1201, the CPU 402_S inspects whether there are data of which a tendency of past time series variation is similar to that of the status information data subjected to the interpolation process among different status information data of the same apparatus and the status information data of other apparatus. Specifically, a cluster analysis is applied to each data of the section from the past predetermined time to the present. As the cluster analysis, the method that obtains a Euclidean distance and performs clustering is known, for example.

In S1202, the CPU 402_S determines whether there is a similar data. For example, in a case of the above-mentioned method that obtains a Euclidean distance and performs clustering is used, when there is a data of which a Euclidean distance is equal to or less than a predetermined value, it is determined that there is a similar data, and otherwise, it is determined that there is no similar data. When determining that there is no similar data (NO in S1202), the CPU 402_S proceeds with the process to S1203. The CPU 402_S determines that the interpolation process using the different data cannot be performed and sets the interpolation propriety flag 610 that is associated with the data item 601 to "0 (zero)" in S1203, and thereby, finishes this process.

In the meantime, when determining that there is a similar data (YES in S1202), the CPU 402_S proceeds with the process to S1011 in FIG. 10B. In S1011 in this case, the allowable deficiency rate is calculated using the relation between the interpolation error in the interpolation processes, such as HotDeck imputation and ColdDeck imputation shown in FIG. 11, and the data deficiency rate. In S1012, the CPU 402_S calculates the past data deficiency rate of the different data and determines whether the calculated data deficiency rate is included in the range of the allowable deficiency rate.

The CPU 402_S proceeds with the process to S1003 after the process in S1002 is completed. In S1003, the CPU 402_S determined whether the processes of S1001 and S1002 have been applied to all the data of all the connected apparatuses. When determining that the processes have been applied to all the data of all the connected apparatuses (YES in S1003), the CPU 402_S finishes this process. When determining that the processes have been applied to not all the data of all the connected apparatuses (NO in S1003), the CPU 402_S returns the process to S1001.

Figure 12B:
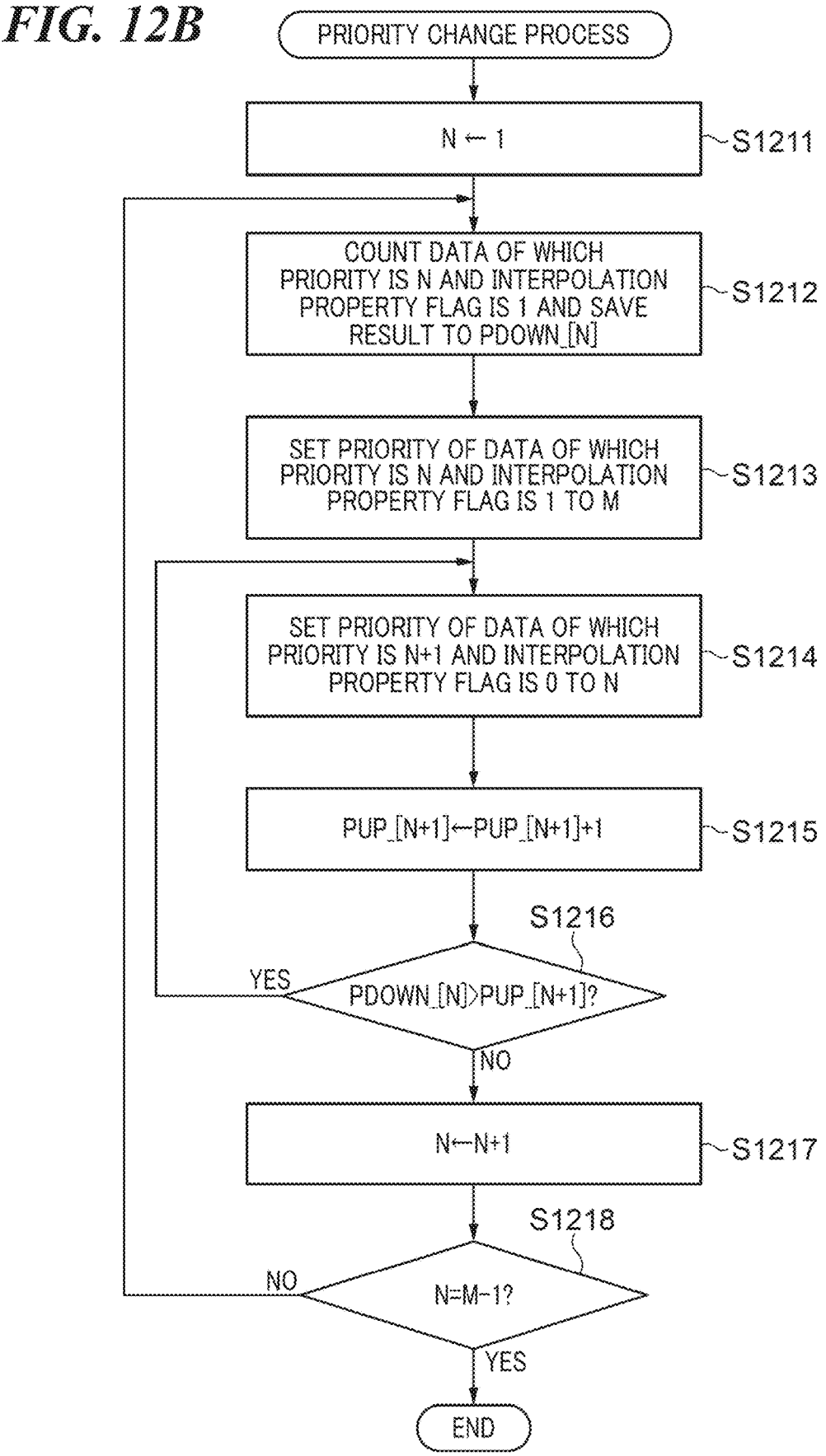
FIG. 12B is a flowchart describing a priority change process of P917 in FIG. 9.

Next, the details of the priority change process (P917) will be described. FIG. 12B is a flowchart showing the priority change process (P917). Processes shown by S-numbers (steps) in the flowchart in FIG. 12B are achieved when the CPU 402_S runs the predetermined program stored in the memory 403. In the description, "N" represents the value of the priority 602 in the flowchart of FIG. 12B. The highest priority is represented by N=1. Moreover, the priority 602 shall take the value of 1 through M. N and M are natural numbers and satisfy the relationship of "N<M".

In S1211, the CPU 402_S sets the value of N to "1". That is, the data (sensor measured values) of the data item 601 of which the priority 602 is set to "1" become a first analysis target among the status information data. In S1212, the CPU 402_S counts the data of which the value of the priority 602 is N and the interpolation propriety flag is set to "1", and stores the counted value in a variable PDOWN_[N]. In 51213, the CPU 402_S changes the priority 602 of the data item 601 of which the priority 602 is "N" and the interpolation propriety flag is "1" to "M" from "N". Thereby, the priority 602 of the data item 601 of which the priority 602 is "1" and that enables the interpolation is changed to "3" by the first turn of the process S1211 through 1213, for example.

In S1214, the CPU 402_S selects one data item 601 of which the priority 602 is "N+1" and the interpolation propriety flag in FIG. 6B is "1", and sets (changes) its priority 602 to "1". The process of S1214 is performed for each item in an ascending order of the data item 601 in the table in FIG. 6A. In S1215, the CPU 402_S adds '1' to a value of a variable PUP_[N+1] that represents the number of the data items 601 of which the priorities 602 are changed in S1214.

In S1216, the CPU 402_S determines whether the value of variable PUP_[N+1] is smaller than the value of variable DOWN_[N] stored in S1212. When determining that PUP_[N+1] is smaller than DOWN_[N] (YES in S1216), the CPU402_S returns the process to S1214. When determining that PUP_[N+1] is not smaller than DOWN_[N] (NO in S1216), the CPU402_S proceeds with the process to S1217.

Thereby, the priorities 602 of the data items 601 of which the priority 602 is "N+1" and that cannot be interpolated can be changed to "N". The number of the changed data items is equal to the number of the data items 601 of which the priorities have been changed to "M" from "N". When there is no data item 610 of which the priority 602 is changed from "N+1" to "N" when the process returns to S1214, the process proceeds to S1217 (not shown).

In S1217, the CPU 402_S increments the value of "N". In S1218, the CPU 402_S determines whether "N" is equal to "M−1". When determining that "N" is not equal to "M−1" (NO in S1218), the CPU 402_S returns the process to S1212. When determining that "N" not equal to "M−1" (YES in S1218), the CPU 402_S finishes this process. Thereby, the priorities 602 of the data items 601 of which the priorities can be changed among all the data items 601 can be changed. As described as the process of P918 in FIG. 9, when the priority 602 is changed by the server 103, the information about the changed priority 602 is transmitted to the image forming apparatus 102, and the definition of the priority 602 is updated in the image forming apparatus 102.

Next, a concrete example of the process executed by the image forming apparatus 102 among the execution of the entire process in the management system 100 will be described. First, a data obtainment process in the image forming apparatus 102 is described. FIG. 13 is a flowchart showing the data obtainment process executed by the printer unit 200 of the image forming apparatus 102. The data obtained in this process means the status information data 354. Since the data obtainment process in the reader unit 240 is performed similarly to the data obtainment process in the printer unit 200, the description is omitted. Moreover, the process in the system controller 300 about the data obtainment process in the image forming apparatus 102 is mentioned later by referring to FIG. 14.

In the printer unit 200, the data management module 520 and the device control module 530 independently perform processes in response to the instructions from the system controller 300 (the CPU 301). The device control module 530 executes the process concerning a print job in S1309. In the print job, the mechanisms concerning the image formation, such as the photosensitive members 201a through 201d, the exposure devices 203a through 203d, and the development devices 204a through 204d, of the printer unit 200 operate in cooperation in response to an instruction from the job control module 510 so as to print on the recording medium S.

It should be noted that the print job process of S1309 and the below-mentioned process of S1301 through S1308 executed by the data management module 520 are executed asynchronously. That is, the process of S1301 through S1308 may be executed in parallel to the executing process of S1309 or may be executed when the process of S1309 is not executing.

The information obtainment unit 352 determines whether it is a data obtainment timing in S1301. In the description, the data obtainment timings are set by the timer 350 as mentioned above. In addition, timings before and after performing the job according to instructions by a user or the maintenance person 106 may be included. Moreover, the data acquisition timings may be set at different times or different time intervals for the sensors of the sensor group 351. When the information obtainment unit 352 determines that it is not the data obtainment timing (NO in S1301), the process is returned to S1301. When it is determined as the data obtainment timing (YES in S1301), the process proceeds to S1302.

In S1302, the information obtainment unit 352 obtains data and stores it in the memory 353. That is, the sensor measured values are obtained from the sensor group 351, the pieces of timing information corresponding to the sensor measured values are obtained, and they are stored in the memory 353 as the status information data 354. It should be noted that the status information data 354 is stored in the memory 353 as described with reference to the schematic view in FIG. 7. Moreover, the storing method of the new status information data 354 in a case where the capacity of the memory 353 for storing the new status information data 354 runs short has been described by referring to FIG. 8A and FIG. 8B.

In S1303, the information obtainment unit 352 determines whether the obtainment of data is finished. When the information obtainment unit 352 determines that the obtainment of data is not finished (NO in S1303), the process is returned to S1301. When it is determined that the obtainment of data is finished (YES in S1303), the process proceeds to S1308. In a case where the data is obtained at the timings before and after performing the job according to instructions by a user or the maintenance person 106, the completion of obtainment of all the data according to the instructions by the user or the maintenance person 106 may be used as the criterion of S1303.

In S1308, the information obtainment unit 352 sets a new data flag, which shows completion/incompletion of the data transfer to the system controller 300, to "1" and stores it in the memory 353. The case where the new data flag is "1" shows that the data that are not transferred to the system controller 300 remain in the memory 353.

Although the data obtainment process is finished by S1308, the data transfer process from the memory 353 to the system controller 300 is performed asynchronously with the data obtainment process. That is, the information obtainment unit 352 determines whether the data transfer request has been received from the CPU 301 in S1304. When the information obtainment unit 352 determines that the data transfer request has not received (NO in S1304), the determination of S1304 is continued. When the information obtainment unit 352 determines that the data transfer request has received (YES in S1304), the process proceeds to S1305.

In S1305, the information obtainment unit 352 transmits the data stored in the memory 353 to the system controller 300 through the data transmission module 523. In S1306, the information obtainment unit 352 determines whether transmission of all the data in the memory 343 to the system controller 300 is finished. When the information obtainment unit 352 determines that the data transmission is not finished (NO in S1306), the process is returned to S1304. When it is determined that the data transmission is finished (YES in S1306), the process proceeds to S1307.

In S1307, the information obtainment unit 352 sets the new data flag to "0 (zero)" and stores it in the memory 353. Thereby, the data transfer process to the system controller 300 is completed. The case where the new data flag is "0" shows that the data that should be transferred to the system controller 300 does not remain in the memory 353. Moreover, as described by referring to FIG. 7, FIG. 8A, and FIG. 8B, the storing method of the data (sensor measured values) to the memory 353 is changed depending on the value of the new data flag.

Figure 14:
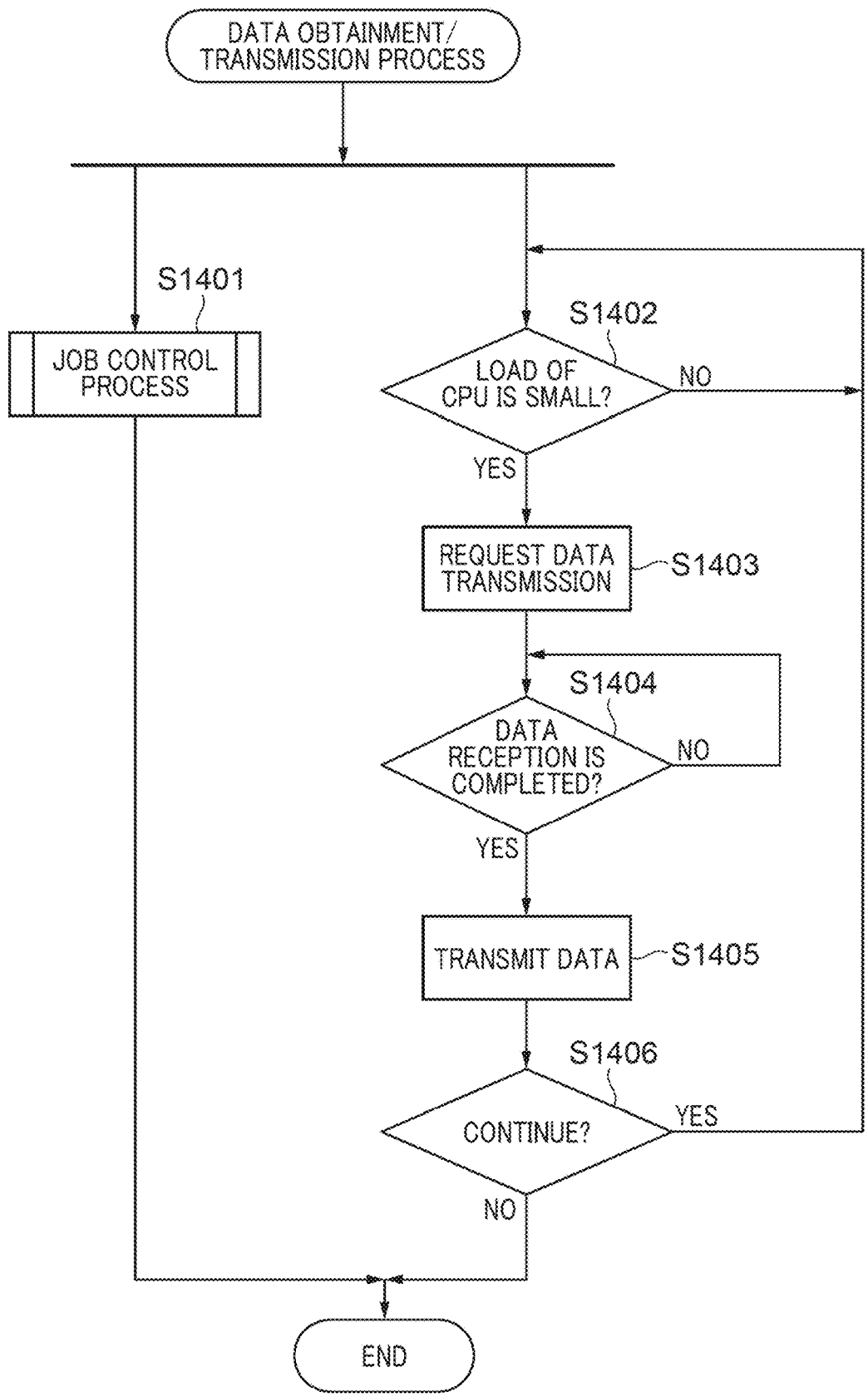
FIG. 14 is a flowchart showing a process to obtain the status information data and to transmit it to the server executed by the system control unit of the image forming apparatus.

FIG. 14 is a flowchart showing a process concerning to obtainment of data by the system controller 300 of the image forming apparatus 102 and transmission of the data to the server 103. In the description, the system controller 300 obtains status information data and transmits the data to the server 103. Processes of the flowchart in FIG. 14 correspond to the processes executed in P901 through P903 in FIG. 9 and are achieved when the CPU 301 of the system controller 300 runs the programs 321.

In S1401, the CPU 301 controls the job executed by the image forming apparatus 102. Specifically, the system controller 300 integrally controls jobs that are input through the operation unit 312 or the network I/F 330. The jobs include a scan job to read an image, a print job to form an image, a facsimile receiving job, etc. Then, the log data 323 that records the operation situations of the reader unit 240 and printer unit 200 during execution of a job are stored in the storage unit 320 at any time. It should be noted that the process of S1401 and the below-mentioned process of S1402 through S1406 are executed asynchronously. The process of S1402 through S1406 may be executed during the job control and may be executed when the job control is not performed.

In S1402, the CPU 301 determines whether the load of the CPU 301 is small by a reason that the job control is not performed, etc. When determining that the load is not small (NO in S1402), the CPU 301 repeats the determination of S1402 in order to wait until the load becomes small. In the meantime, when determining that the load of the CPU 301 is small (YES in S1402), the process proceeds to S1403.

In S1403, the CPU 30 transmits the data transfer request to the printer unit 200 and reader unit 240. In S1404, the CPU 301 determines whether the data reception from the printer unit 200 and reader unit is completed. When determining that the data reception is not completed (NO in S1404), the CPU 301 continues the data reception. When determining that the data reception is completed (YES in S1404), the CPU 301 proceeds with the process to S1405. It should be noted that the CPU 301 reads the log data 323 stored in the storage unit 320 in parallel to the process of S1404 or in a period between the completion of the process of S1404 and the start of the process of S1405.

In S1405, the CPU 301 transmits the status information data and the log data 323 to the server 103. In S1406, the CPU 301 determines whether the process of data obtainment and data transmission is continued. When determining that the process is continued (YES in S1406), the CPU 301 returns the process to S1402. When determining that the process is finished (NO in S1406), the CPU 301 finishes this process.

Figure 15:
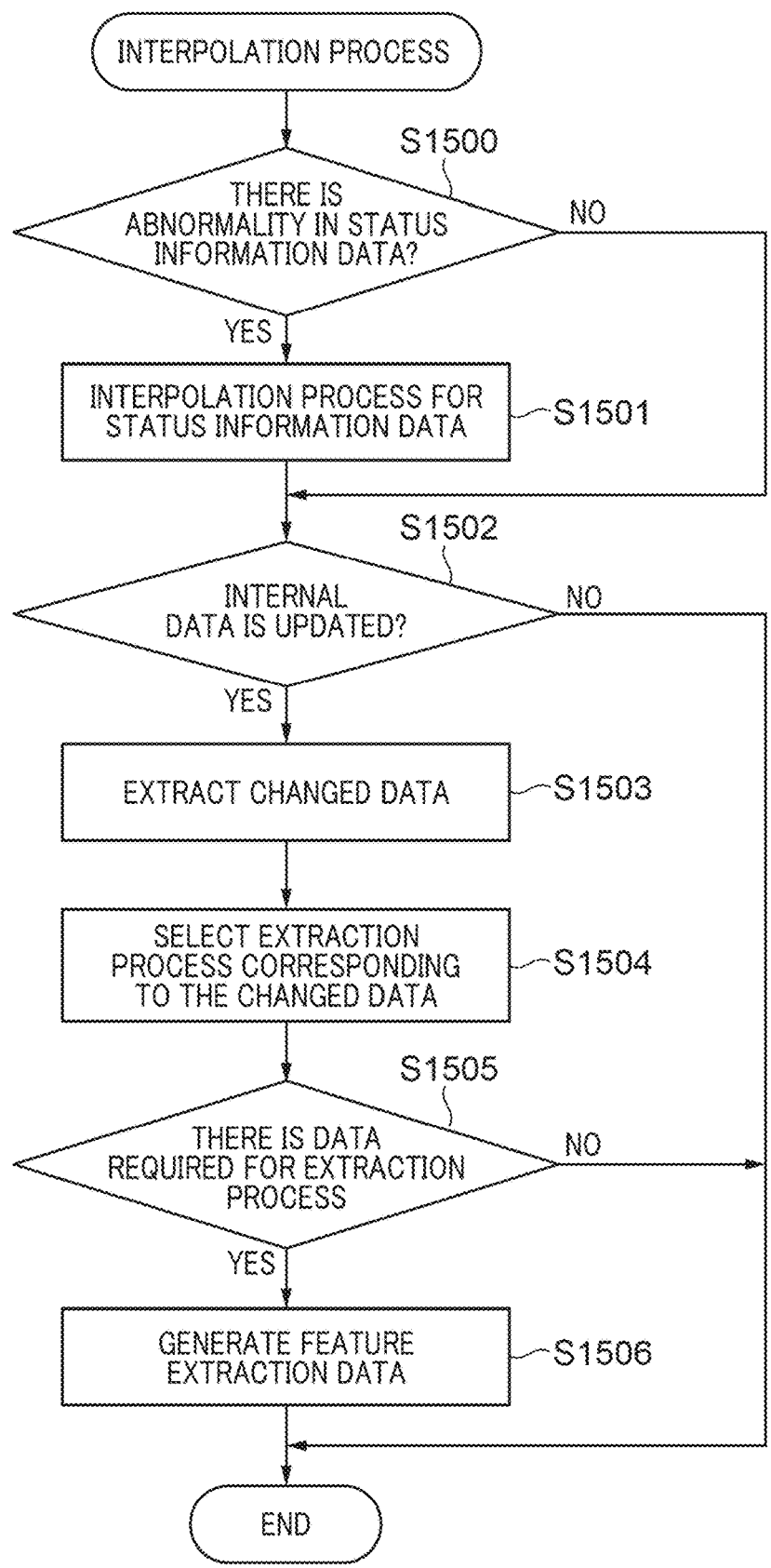
FIG. 15 is a flowchart showing an interpolation process executed by the server.

Next, a flow of a process concerning to the execution of the process of P904 through P908 in FIG. 9 that is executed by the server 103 will be described. FIG. 15 is a flowchart showing the interpolation process executed by the server 103. Processes shown by S-numbers (steps) in the flowchart in FIG. 15 are achieved when the CPU 402_S runs the program stored in the memory 403 and integrally controls operations of the units that constitute the server 103.

In S1500, the CPU 402_S inspects the status information data obtained from the image forming apparatus 102 on the basis of the timing information values and determines whether there is a data abnormality, such as misplacement, deficiency, or duplication. When determining that there is no abnormality in the status information data (NO in S1500), the CPU 402_S proceeds with the process to S1502. When determining that there is an abnormality in the status information data (YES in S1500), the CPU 402_S proceeds with the process to S1501.

In S1501, the CPU 402_S performs the data interpolation process. In S1501, when there are duplicated data, one data is left and the other data are discarded (deleted). When the data are misplaced, the data are sorted.

Figure 16A:
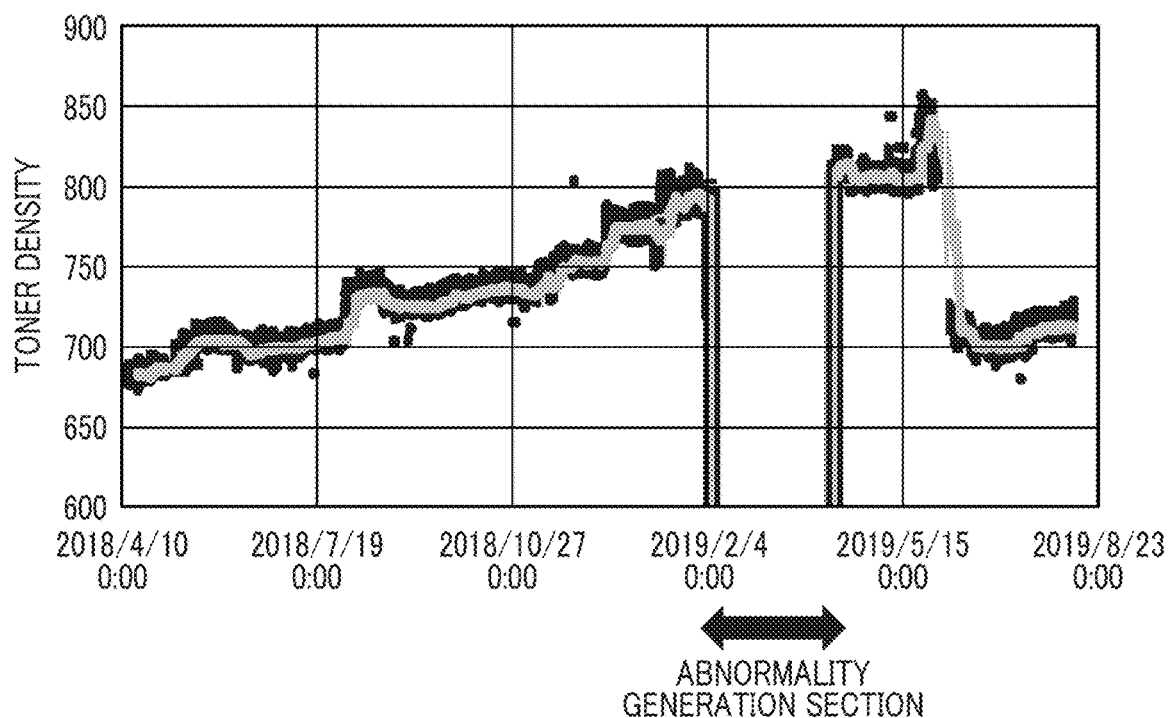
FIG. 16A and FIG. 16B are graphs respectively showing the status information data before applying the interpolation process and the status information data after applying the interpolation process.
Figure 16B:
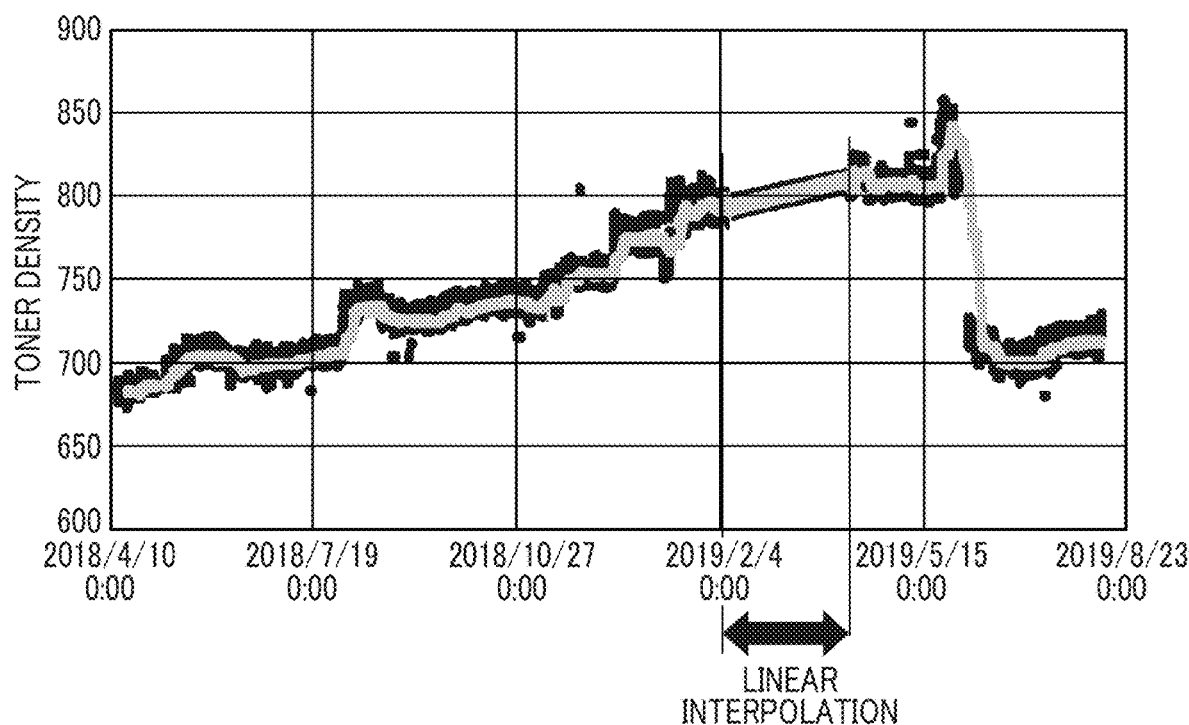

A concrete example of the data interpolation process will be described. FIG. 16A and FIG. 16B are graphs showing an example of the interpolation process to the status information data (toner density). In FIG. 16A and FIG. 16B, a horizontal axis represents time and a vertical axis represents the toner density that is obtained by quantizing a voltage obtained by the density detection sensor 220 into 10 bits (0 through 1023).

FIG. 16A shows the data before applying the interpolation process. Since the process that overwrites old data with new data like the example described by referring to FIG. 8B occurs, the density values are lost in the range corresponding to the old data that are lost by the overwriting. In the meantime, as shown in FIG. 6B, the interpolation process 608 and the allowable error 609 are defined for each data item 601 according to the character of data. Accordingly, when the data abnormality is detected, the CPU 402_S performs a data interpolation process using the interpolation process defined to the data item 601 of the data. Thereby, as shown in FIG. 16B, a linear interpolation based on normal data is performed, and the lost data is supplemented. It should be noted that the data interpolation process is preferably defined in consideration of the character of the data to obtain and is not restricted to the linear interpolation.

After the interpolation process of the status information data is completed, the CPU 402_S determines whether the internal data is updated in a period between the reception of the status information data and the current timing in S1502. When determining that the internal data is not updated (NO in S1502), the CPU 402_S finishes this process because there is no data that should be newly generated. In the meantime, when determining that the internal data is updated (YES in S1502), the CPU 402_S proceeds the process to S1503. In S1503, the CPU 402_S extracts data fluctuated in this term from the internal data.

In S1504, the CPU 402_S selects the feature extraction process defined beforehand for each data item 601 to the updated data. Although the definition table in FIG. 6B defines one feature extraction process for each data item 601, two or more feature extraction processes may be defined. In S1505, the CPU 402_S determines whether there is a data required to execute the feature extraction process. This is because not only updated data but also the predetermined number of pre-update data in the predetermined period are needed to find the maximum value and the moving average deviation using the predetermined data (sensor measured value). It should be noted that the predetermined period and the predetermined number shall be determined in advance for each feature extraction process and shall be managed like the management table in FIG. 6B.

When determining that there is no data required to execute the feature extraction process (NO in S1505), the CPU 402_S finishes this process. When determining that there is a data required to execute the feature extraction process (YES in S1505), the CPU 402_S proceeds with the process to S1506. In S1506, the CPU 402_S executes the feature extraction process selected in S1504 to generate the feature extraction data, stores the generated feature extraction data into the external storage unit 405, and finishes this process.

Figure 17:
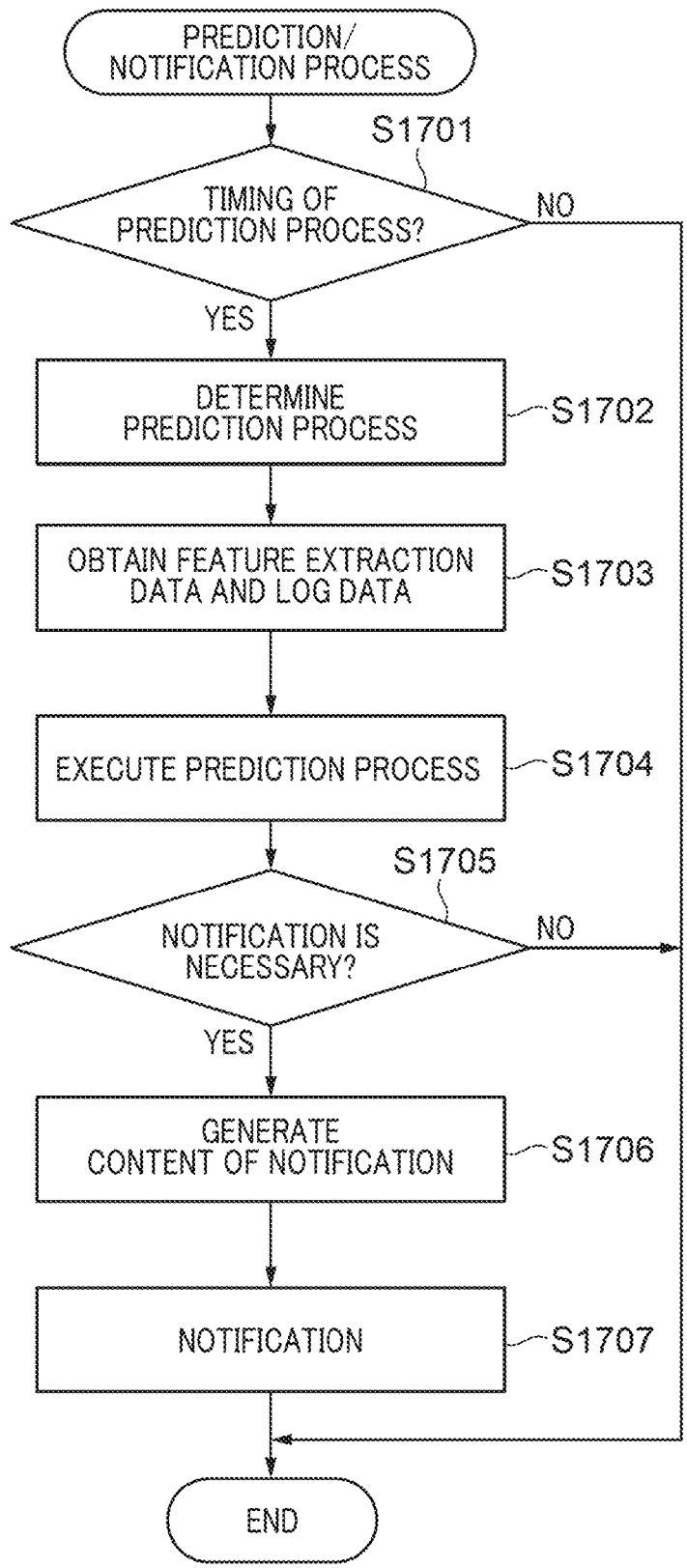
FIG. 17 is a flowchart showing a prediction process and a notification process executed by a prediction device.

FIG. 17 is a flowchart showing the prediction process and notification process that the analysis apparatus 105 executes in P909 through P912 in FIG. 9. Processes shown by S-numbers (steps) in the flowchart in FIG. 17 are achieved when the CPU 402_A of the analysis apparatus 105 develops the program stored in the external storage unit 405 of the analysis apparatus 105 to the memory 403 of the analysis apparatus 105 and runs it.

In S1701, the CPU 402_A determines whether the timing at which the prediction process is performed has come. The timing at which the prediction process is performed is determined in advance for each prediction process executed. The prediction process is executed at predetermined intervals or a predetermined time. Alternatively, the prediction process may be performed at the timing when the maintenance of the image forming apparatus 102 is requested by the user or the maintenance person 106. When determining that it is not the timing to perform the prediction processes (NO in S1701), the CPU 402_A finishes this process. When determining that it is the timing to perform the prediction process (YES in S1701), the CPU 402_A proceeds with the process to S1702.

In S1702, the CPU 402_A determines the prediction process that will be executed. For example, when the maintenance person 106 requests to check the status of the intermediate transfer belt 209, the CPU 402_A determines to perform the prediction process corresponding to the request. In S1703, the CPU 402_A obtains data (a feature extraction data and log data) required in order to perform the prediction process determined in S1702 from the server 103.

In S1704, the CPU 402_A executes the prediction process using the feature extraction data and log data obtained. For example, the data about the rotational speed of the intermediate-transfer-belt motor can be obtained from the data that represents the status of the intermediate transfer belt 206. The feature extraction data is generated by applying the histogram generation process to the data of the rotation speed. Occurrence of an error and its sign about the intermediate transfer belt motor can be judged by performing a process for finding dispersive power on the basis of the feature extraction data. Moreover, when the moving average process is applied to the data of the travel distance of the secondary transfer roller, the feature extraction data is generated. A sign of an error about the secondary transfer roller can be judged by performing a tilt analysis process to the feature extraction data.

In S1705, the CPU 402_A determines whether the user and the maintenance person 106 should be notified of the generated prediction result. When determining that the notification is unnecessary (NO in S1705), the CPU 402_A finishes this process. When determining that the notification is necessary (YES in S1705), the CPU 402_A proceeds with the process to S1706. In S1706, the CPU 402_A generates notice contents. Then, the CPU 402_A notifies the user and the maintenance person 106 of the generated notice contents in S1707, and finishes this process.

Figure 18A:
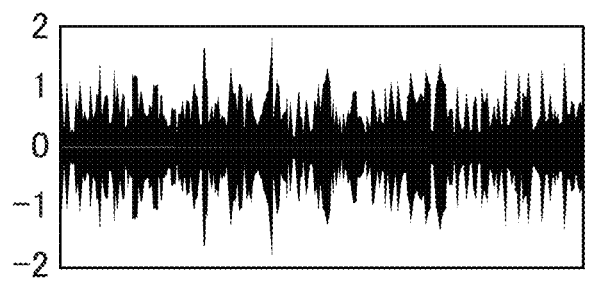
FIG. 18A, FIG. 18B, FIG. 18C, FIG. 18D, and FIG. 18E are views describing an example of the prediction process executed by the prediction device.

FIG. 18A, FIG. 18B, FIG. 18C, FIG. 18D, and FIG. 18E are views describing an example of the prediction process performed by the analysis apparatus 105 on the basis of the status information data generated in the image forming apparatus 102 and the feature extraction data generated by the server 103 on the basis of the status information data. As mentioned above, the status information data is generated by combining the sensor measured values detected at the predetermined time and the timing information. FIG. 18A is an example of the sensor measured value obtained by the image forming apparatus 102, and is a view showing the time variation of the rotational speed of the intermediate-transfer-belt motor.

Figure 18B:
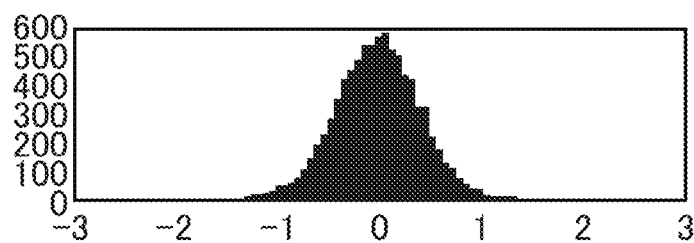
Figure 18C:
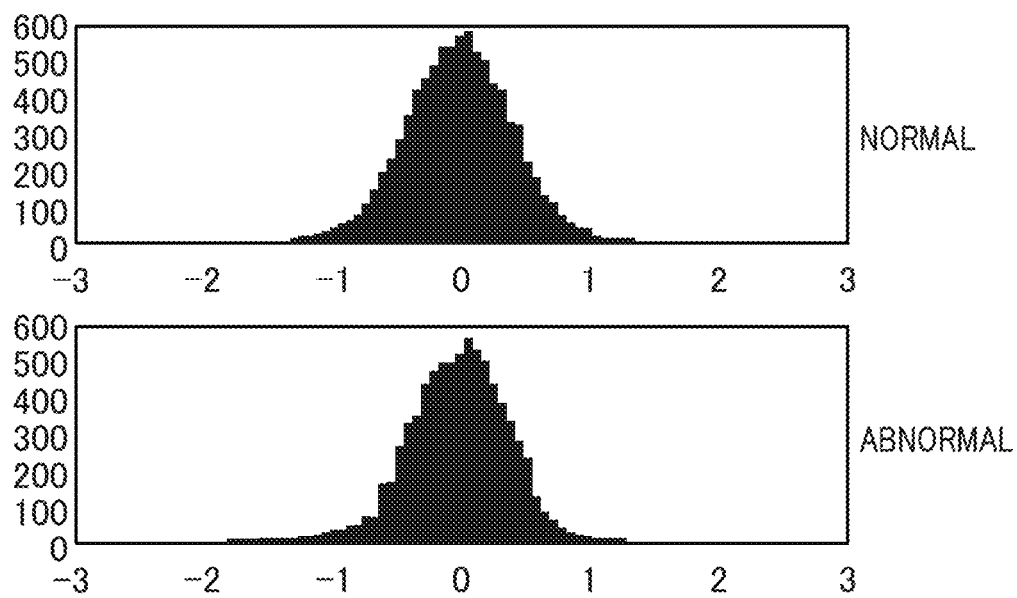

FIG. 18B is a view showing the result obtained by performing the histogram generation process as the feature extraction process to the rotational speed of the intermediate-transfer-belt motor of FIG. 18A. FIG. 18C shows views showing examples of results of the prediction process that the analysis apparatus 105 performed using the status information data that are used for the histogram generation process in FIG. 18B. Specifically, FIG. 18C shows the results that are predicted using the dispersive powers of the histograms on the basis of the accumulation results of the status information data that are subjected to the histogram generation process until the time of applying the prediction process.

The upper view in FIG. 18C shows the prediction result about a certain image forming apparatus. Since the prediction result is equal to or more than the predetermined dispersive power, the analysis apparatus 105 determines that the image forming apparatus is normal. In the meantime, the lower view in FIG. 18C shows the prediction result about another image forming apparatus. Since the prediction result is less than the predetermined dispersive power, the analysis apparatus 105 determines that there is a sign of an abnormality in this image forming apparatus. Although the example that performs the prediction process by finding the dispersive power from the status information data to which the histogram generation process is applied is described, the prediction process can be performed using values other than the dispersive power, such as average, skewness, and kurtosis.

Figure 18D:
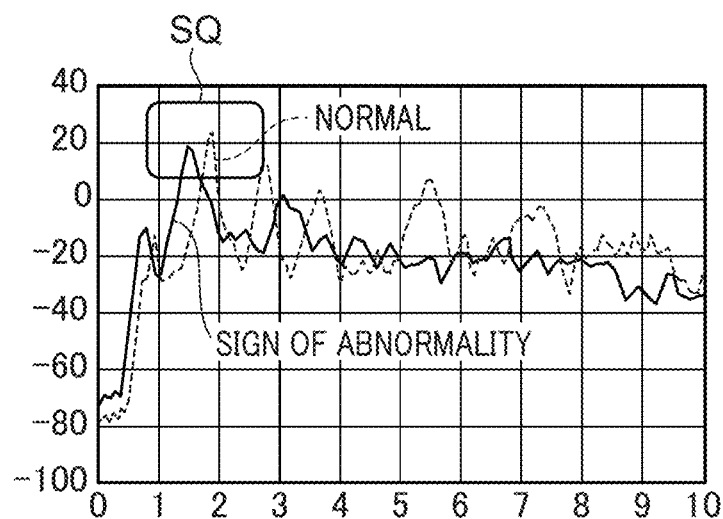

FIG. 18D is a graph showing the result of performing a spectral process that is one example of the feature extraction process to the other status information data and the prediction result of the result by the analysis apparatus 105. This prediction result is the result of prediction by analyzing the cycle of a spectrum on the basis of the accumulation result of the status information data that is subjected to the spectral process until the time of applying the prediction process.

In FIG. 18D, a broken line (dotted line) denotes a prediction result about a certain image forming apparatus. Since a cycle of the waveform in a square frame SQ is less than a predetermined value, the analysis apparatus 105 determines that the image forming apparatus is normal. In the meantime, in FIG. 18D, a solid line denotes a prediction result about another image forming apparatus. Since a cycle of the waveform in the square frame SQ is larger than the predetermined value, the analysis apparatus 105 determines that there is a sign of an abnormality in this image forming apparatus.

Figure 18E:
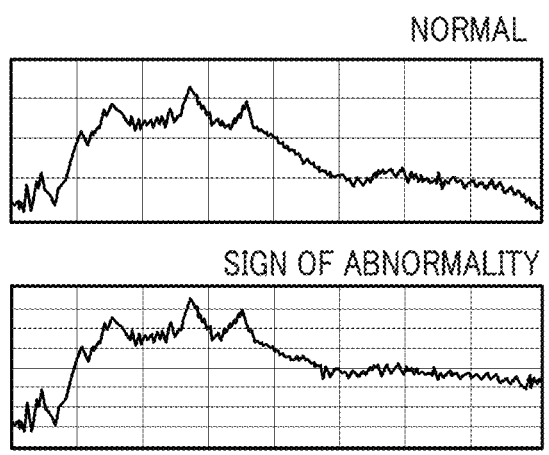

FIG. 18E shows views showing the result of performing the moving average process that is one example of the feature extraction process to still another the status information data and the prediction result of the result by the analysis apparatus 105. According to the moving average process, a measurement error can be reduced and the tendency of sensor measured values can be grasped with small data volume. This prediction result is obtained by analyzing the tilt of the moving average on the basis of the accumulation result of the status information data that is subjected to the moving average process until the time of applying the prediction process.

The upper view in FIG. 18E shows the prediction result about a certain image forming apparatus. Since any tilts of the waveform is less than a predetermined value, the analysis apparatus 105 determines that the image forming apparatus is normal. In the meantime, the lower view in FIG. 18E shows the prediction result about another image forming apparatus. Since a part of tilts of the waveform is larger than the predetermined value, the analysis apparatus 105 determines that there is a sign of an abnormality in this image forming apparatus.

According to the above mentioned embodiment, malfunctions and lives of various components mounted on the image forming apparatus can be predicted, and the maintenance can be suitably performed based on the prediction result. Moreover, the collection of the status information data, which are used to the prediction process, in the image forming apparatus and the transmission of the collected data to the server can be performed without disturbing the job processes, such as a print job, a copy job, a facsimile transmission job, that are the basic function of the image forming apparatus. Furthermore, in case a deficiency occurs in the status information data, since the priorities are assigned to the obtained data on the basis of the interpolation error that occurs when the defective data is interpolated, a malfunction and a life of a component can be predicted at a high accuracy.

Although the present invention has been described in detail on the basis of the suitable embodiment, the present invention is not limited to the specific embodiment. Various configurations that do not deviate from the gist of the present invention are also included in the present invention. Furthermore, the embodiment mentioned above merely shows one configuration of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-204960, filed Dec. 10, 2020, which is hereby incorporated by reference herein in its entirety.

What is claimed is:

1. A management system comprising:
    at least one image forming apparatus comprising:
        an obtainment unit configured to obtain data showing statuses inside the at least one image forming apparatus for items to which priorities that define obtainment orders are given;
        a first storage unit configured to store the data as time series data;
        a transmission unit configured to transmit the data stored in the first storage unit to a management apparatus that is communicatively connected with the at least one image forming apparatus; and
        an update unit configured to update the priorities of the items according to a notification transmitted from the management apparatus; and
    the management apparatus comprising:
        a second storage unit configured to store data transmitted from the at least one image forming apparatus;
        a determination unit configured to determine whether interpolation of defective data based on the data accumulated in the second storage unit is possible for the items in a case where deficiency occurs in the data stored in the second storage unit;
        a change unit configured to change the priorities of the items according to possibility of the interpolation determined by the determination unit; and a notification unit configured to notify the at least one image forming apparatus of the priorities of the items that are changed by the change unit.

2. The management system according to claim 1, wherein the change unit decreases a priority of an item that the determination unit determines that the interpolation is possible among the items and increases a priority of an item that the determination unit determines that the interpolation is impossible among the items.

3. The management system according to claim 1, wherein the at least one image forming apparatus comprises a plurality of image forming apparatuses, and
wherein the data accumulated in the second storage unit are obtained from the image forming apparatus that is subjected to the interpolation and an image forming apparatus of which properties are similar to that of the image forming apparatus among the plurality of image forming apparatuses.

4. The management system according to claim 1, wherein the determination unit determines that the interpolation is possible in a case where an error caused by the interpolation falls within a predetermined allowable error range.

5. The management system according to claim 1, wherein the obtainment unit comprises:
a detection unit configured to detect data inside the at least one image forming apparatus; and
a data storing unit configured to store the data detected by the detection unit into the first storage unit,
wherein addresses of the first storage unit are divided depending on the priorities given for the items, and
wherein the data storing unit overwrites an address storing data of a low priority item with new data of a high priority item in a case where a storage capacity of the first storage unit is deficient to store the new data to the first storage unit.

6. The management system according to claim 1, wherein the at least one image forming apparatus comprises:
a controller configured to totally control the at least one image forming apparatus; and
a third storage unit,
wherein the controller moves the data stored in the first storage unit to the third storage unit in a case where load about an information process in the controller is low and reduces movement of the data from the first storage unit to the third storage unit in a case where the load is large, and
wherein the data stored in the first storage unit is transmitted to the management apparatus through the third storage unit.

7. A image forming apparatus comprising: a printer unit configured to print an image to a recording medium; an obtainment unit configured to obtain data showing statuses inside the image forming apparatus for items to which priorities that define obtainment orders are given; a storage unit configured to store the data as time series data; a controller configured to overwrite an address storing data of the low priority item with new data of the high priority item in a case where a storage capacity of the first storage unit is deficient to store the new data to the first storage unit; and an update unit configured to updates the priorities of the items according to changed priorities in a case where the priorities are changed in an external apparatus that obtains the data stored in the storage unit.

8. A management apparatus comprising:
an obtainment unit configured to obtain data showing statuses inside an image forming apparatus for items to which priorities that define an order of data that should be obtained and stored preferentially in the image forming apparatus are given;
a storage unit configured to store the data that the obtainment unit obtained;
a determination unit configured to determine whether interpolation of defective data based on the data accumulated in the storage unit is possible for the items in a case where deficiency occurs in the data stored in the storage unit; a change unit configured to change the priorities of the items according to possibility of the interpolation determined by the determination unit; and
a notification unit configured to notify the image forming apparatus of the priorities of the items that are changed by the change unit.

9. A control method for a management system that has an image forming apparatus and a management apparatus that are communicatively connected each other, the control method comprising:
obtaining data showing statuses inside an image forming apparatus for items to which priorities that define an order of data that should be obtained and stored preferentially are given in the image forming apparatus;
storing the data to a storage unit in the image forming apparatus; transmitting the stored data to the management apparatus in the image forming apparatus;
storing the data transmitted from the image forming apparatus to the storage unit in the management apparatus;
determining whether interpolation of defective data based on the data accumulated in the storage unit is possible for the items in a case where deficiency occurs in the data stored in the storage unit in the management apparatus;
changing the priorities of the items according to possibility of the interpolation determined by the determination unit in the management apparatus; notifying the image forming apparatus of the priorities of the items that are changed by the change unit in the management apparatus; and
updating the priorities of the items according to a notification from the management apparatus in the image forming apparatus.

* * * * *